United States Patent [19]
Kitamura et al.

[11] Patent Number: 5,986,996
[45] Date of Patent: Nov. 16, 1999

[54] OPTICAL PICK-UP AND OPTICAL RECORDING SYSTEM

[75] Inventors: Shojiro Kitamura; Katsumi Mori; Takayuki Kondo; Takeo Kaneko; Toshio Arimura, all of Suwa, Japan

[73] Assignee: Seiko Epson Corporation, Tokyo, Japan

[21] Appl. No.: 08/952,012

[22] PCT Filed: Mar. 10, 1997

[86] PCT No.: PCT/JP97/00744

§ 371 Date: Nov. 26, 1997

§ 102(e) Date: Nov. 26, 1997

[87] PCT Pub. No.: WO97/34297

PCT Pub. Date: Sep. 18, 1997

[30] Foreign Application Priority Data

Mar. 11, 1996 [JP] Japan ..................................... 8-53293
Mar. 27, 1996 [JP] Japan ..................................... 8-71864
Mar. 27, 1996 [JP] Japan ..................................... 8-71867

[51] Int. Cl.$^6$ ....................................................... G11B 7/12
[52] U.S. Cl. .......................... 369/116; 369/121; 369/110; 369/44.23; 369/44.12
[58] Field of Search ............................. 369/44.23, 44.24, 369/44.12, 44.14, 112, 110, 109, 103, 116, 121, 122, 54, 58

[56] References Cited

U.S. PATENT DOCUMENTS 4,566,088 1/1986 Yoshida et al. .
4,841,514 6/1989 Tsuboi et al. .
5,483,511 1/1996 Jewell et al. ........................ 369/112 X

FOREIGN PATENT DOCUMENTS

| 0 742 554 A2 | 11/1996 | European Pat. Off. . |
| 01060829 | 3/1989 | Japan . |
| 01098137 | 4/1989 | Japan . |
| 01251439 | 6/1989 | Japan . |
| 04102239 | 4/1992 | Japan . |
| 7-65407 | 3/1995 | Japan . |
| 7-98431 | 4/1995 | Japan . |
| 7-192291 | 7/1995 | Japan . |

*Primary Examiner*—Muhammad Edun
*Attorney, Agent, or Firm*—Oliff & Berridge, PLC

[57] ABSTRACT

An optical pick-up according to the present invention is designed such that laser beams having different polarization directions or different radiation angles are irradiated from laser beam sources formed in a surface emitting laser array to change the effective numerical aperture of an optical element having an objective lens, or the like. An optical pick-up having high capability with an optical disk having a low recording density and a thick substrate according to the CD standard, and an optical disk having a high recording density and a thin substrate according to the DVD standard, can be realized. A plurality of laser beam sources can be formed in a small space by employing a surface emitting laser array, and the numerical aperture of the optical system can be controlled by selecting a laser beam. For this reason, an optical pick-up having compatibility can be realized with an extremely simple arrangement, and a compact and high-performance optical pick-up can be provided at low cost.

30 Claims, 15 Drawing Sheets

IN-FOCUS STATE

DISTANCE BETWEEN OBJECTIVE LENS AND OPTICAL DISK IS SHORT

DISTANCE BETWEEN OBJECTIVE LENS AND OPTICAL DISK IS LONG

| øW (μm) | RADIATION ANGLE (FULL ANGLE AT HALF VALUE) |
|---|---|
| 3 | 20° |
| 5 | 15° |
| 7 | 10° |
| 9 | 8° |
| 11 | 6° |

OPTICAL PICK-UP AND OPTICAL RECORDING SYSTEM

BACKGROUND OF THE INVENTION

1. Field of the Invention

The present invention relates to an optical pick-up and an optical recording system for performing a process such as a recording process or a reproducing process to an optical recording medium such as an optical disk.

2. Description of the Related Art

As an optical disk which is recently available, a compact disk (CD) based on the compact disk standards (CD standards) is known. The substrate of the compact disk has a thickness of 1.2 mm, and a track pitch formed on the surface of the substrate to record information is 1.6 mm. In order to reproduce the CD, an optical pick-up comprising a laser diode for emitting a laser beam having a wavelength of 0.78 mm and an objective lens having a numerical aperture of 0.45 is used. In recent years, various developments were made to increase the recording density of the optical disk, and it is examined in the developments to increase the numerical aperture of the objective lens. When the numerical aperture of the objective lens is increased, the optical resolution is improved. For this reason, the linear recording density on the optical disk can be increased, and the pitch of recording tracks can be decreased. Therefore, the recording density can be considerably increased.

However, when the numerical aperture of the objective lens is increased, a phenomenon that the aberration of a light spot focused by the objective lens occurs. More specifically, due to axial runout of the optical disk and axial runout of a turntable which has the optical disk attached thereto and is rotated, inclination (so-called tilt) of the optical disk and the objective lens occurs, and a coma aberration occurs in this light spot due to this tilt. For this reason, when only the numerical aperture is increased, focusing performance is not improved, and an optical disk having a high recording density cannot be realized.

For this reason, it is considered that, by decreasing the substrate of the optical disk in thickness, the numerical aperture of the objective lens is increased while preventing degradation of an aberration (coma aberration) caused by tilt. On the bas is of this consideration, standardization of the high-density optical disk advances. One of the standards is the standard of a digital video disk (DVD). In this DVD standard, the thickness of the optical disk is set to 0.6 mm, and the track pitch is set to 0.74 mm. To this DVD, a recording or reproducing operation is performed by using an optical pick-up for irradiating a laser beam having a wavelength of 0.65 mm or 0.635 mm through an objective lens having a numerical aperture of 0.6.

When t he optical disk having a thin substrate based o n this standard is used, a recording density can be increased. However, since the objective lens of the DVD optical pick-up is suitably designed for a thin optical disk, a spherical aberration increases when the objective lens is applied to an optical disk having a conventional thick substrate, thereby degrading imaging performance. For this reason, the DVD optical pick-up cannot perform a recording/reproducing operation to a CD. Further development has been made to prevent the above disadvantages. It is considered that a laser beam emitted from the optical pick-up is split into two focusing points to be converged, thereby coping with optical disks having different thicknesses. For example, Japanese Unexamined Patent Publication No. 7-65407 describes the following technique. That is, a light flux emitted from a laser diode is split by adding a prism or a hologram to an optical system, and the light fluxes are converged by different optical lengths, respectively, thereby forming two beam spots. In Japanese Unexamined Patent Publication No. 7-98431, a composite objective lens is formed by combining a deflective objective lens and a hologram lens to form two beam spots.

However, in the optical pick-up described above, in order to make it possible to process optical disks having different thicknesses, one laser beam is split into two beam spots to be converged. For this reason, the energies of the beams converged to the respective beam spots decrease. Therefore, since the intensity of an reflected beam reflected from the optical disk decreases, the sensitivity of the light detector must be improved, or a laser diode having a large laser output power must be employed. For this reason, the optical pick-up increases in size and power consumption, and the manufacturing cost of the optical pick-up also increases. Although an optical disk having a high recording density requires a focus servo or tracking servo having higher precision, a large optical pick-up requires high power to follow a focusing error or a tracking error, and an actuator for performing these servo operations increases in size. In this manner, the optical pick-up having two focusing points and a large size requires high power consumption. For this reason, an optical recording system employing the optical pick-up is also large and expensive, and the power consumption of the optical recording system more increases.

Since the conventional optical pick-up in which two focusing points are always formed by the objective lens always has two beam spots converged by the objective lens, for example, a focus drawing operation performed to a thick optical disk may be erroneously performed at a beam spot for reproducing a thin optical disk. Therefore, a mechanism or control for preventing a focus drawing operation from being performed at the beam spot for reproducing the thin optical disk must be additionally arranged. Furthermore, when a thick optical disk is to be reproduced, there is a beam spot for reproducing a thin optical disk. This beam spot is diffused because it is not focused on the recording surface of the optical disk. The beam spots may be finally incident on photo detectors used for signal detection as stray rays to make noise. For these reasons, a complicated focus drawing mechanism causes the optical pick-up to increase in size and cost, and measures to prevent erroneous operation or stray rays must be taken. These measures are another factor that increases the optical pick-up's size and cost.

By utilizing conventional techniques, laser beam sources and optical elements which are respectively suitable for an optical disk having a low recording density and an optical disk having a high recording density can be independently arranged. However, such an optical pick-up requires a large number of independent laser beam sources and optical elements which further increases its size and cost.

As an optical pick-up which is reduced in size, an optical pick-up using a surface emitting laser array as light sources is disclosed in Japanese Unexamined Patent Publication No. 7-192291. By using an advantage that a surface emitting laser can be easily formed on a two-dimensional array, light sources in which five surface emitting lasers are formed on a single substrate in the form of an array is used (i.e., a surface emitting laser for detecting an information signal, two surface emitting lasers for detecting a focusing error signal, and two surface emitting lasers for detecting a tracking error signal). However, this optical pick-up is used only to obtain a small size, but is not used to reproduce optical disks having different substrate thickness or different track pitches.

Therefore, it is an object of the present invention to provide a compact optical pick-up which can be easily controlled and in which beam spots are appropriately formed on optical disks having both a high recording density and a low recording density, and being different in thickness, without splitting a laser beam into two focusing points to be converged. It is another object of the present invention to provide an optical pick-up which can stably perform a recording/reproducing process to optical disks having different thicknesses, while having a small size, simple arrangement, low power consumption, and low cost.

SUMMARY OF THE INVENTION

For this reason, an optical pick-up according to the present invention comprises a light source for emitting laser beams, an optical element for converging laser beams on an optical recording medium, and light detectors for detecting reflected beams reflected from the optical recording medium. Surface emitting lasers which can be decreased in size by arranging them in the form of an array are employed as the light source, and surface emitting lasers constitute laser beam sources which can emit at least two types of laser beams which can change effective numerical apertures in the optical element. There is provided an optical pick-up which can appropriately form beam spots on optical disks having both a high recording density and a low recording density, and having different thicknesses, without splitting the respective laser beams into two focusing points to be converged. The optical pick-up has a small size and can be easily controlled.

By using a surface emitting laser, for example, two types of laser beams having different polarization directions are selectively output to control the numerical aperture of an optical element. In addition, since a plurality of laser beam sources can be formed in a compact space by forming the surface emitting laser in the form of an array, first and second laser beams which can change effective numerical apertures of the optical elements can be emitted from one laser beam source or a plurality of laser beam sources. Therefore, a compact highly compatible optical pick-up which can be applied to optical disks having different conditions, such as thickness and recording densities, can be provided.

There are various characteristics which affect focusing performance of an optical element, such as the numerical aperture of an optical element, and the wavelength and the power profile of the laser beam. Of these characteristics, to change the numerical aperture of the optical element to be able to form appropriate beam spots on optical disks having different thicknesses, it is considered to form first and second laser beam sources for emitting first and second laser beams having different polarization directions or different radiation angles in a surface emitting laser array.

With respect to the first and second laser beams having different polarization directions, an objective lens for converging the first and second laser beams on an optical recording medium, and a polarization dependent optical element, which can change the numerical aperture of the objective lens for the first and second laser beams, are arranged in an optical element for selecting the first or second laser beams, thereby to control the effective numerical aperture of the objective lens. As the polarization dependent optical element for controlling the numerical aperture of the objective lens, an aperture whose aperture area changes according to the polarization direction of the laser beam, or a polarized hologram which can change at least one of the dispersion angles of the first and second laser beams, can be used.

By using the polarization dependent optical element, the numerical aperture of the optical element can be controlled by changing the effective numerical aperture of the objective lens. Therefore, in order to perform a recording/reproducing process to a thin optical disk having high recording density, a light source can be selected to emit a laser beam which increases the effective numerical aperture of the objective lens by its polarization direction. On the other hand, in order to perform a recording/reproducing process to a thick optical disk having low recording density, another light source can be selected to emit a laser beam which decreases the effective numerical aperture of the objective lens by its polarization direction. For this reason, without changing the arrangement of the optical system itself or the like, the optical pick-up can cope with optical disks having different thicknesses and different recording densities by only selecting a light source for irradiating a laser beam. Therefore, an optical recording system comprising an optical pick-up, laser beam control means which controls a surface emitting laser array to select a first or second laser beam, and position control means which perform position control for the optical pick-up on the basis of a signal from a light detector to control a tracking error and a focusing error, is highly compatible with optical disks such as a CD and a DVD having different specifications.

For example, when an objective lens which is optimally designed for a thin optical recording medium having a high recording density is used for a thick optical recording medium having a low recording density, a spherical aberration increases by the error of the thickness, and focusing performance is degraded. However, since the spherical aberration is in proportion to the 4th power of the numerical aperture, the numerical aperture is decreased by controlling the polarization direction of a laser beam in the optical pick-up to suppress a spherical aberration from being generated, so that a beam spot can also be converged to almost the diffraction limit on a thick optical recording media having a low recording density. Therefore, a recording/reproducing process can be reliably performed to optical recording media having different specifications, e.g., a high recording density and a low recording density. When an objective lens which obtains a numerical aperture of 0.6 by using a light source having a wavelength of 630 nm to 650 nm is employed for an optical disk of the above DVD standard (substrate thickness: 0.6 mm), in order to assure compatibility with the optical disk of the CD standard (substrate thickness: 1.2 mm), it is important to set a wave aberration and a jitter value within an appropriate range. It is understood by the measurement results of the present invention that the limit rate (aperture limit rate) of a numerical aperture obtained by a polarization dependent optical element is preferably set to about 50 to 64%. In addition, when a manufacturing allowance or assembling allowance in manufacturing of an optical pick-up is considered, the aperture limit rate is more preferably set to about 56 to 60%.

On the other hand, when an objective lens is optimally designed for a thick optical recording medium having a low recording density, the resolution is short for the thin optical recording medium having a high recording density. Therefore, in the optical pick-up according to the present invention, the polarization direction of a laser beam is controlled, and a polarized hologram is incorporated to increase the numerical aperture. In this case, the resolution can be increased, and a recording/reproducing process can be reliably performed to an optical recording medium having a high recording density.

In order to control the polarization direction of a laser beam, as a matter of course, a method of arranging a plurality of edge emitting laser diodes having different angles, or a method of changing the direction of an edge emitting laser diode can also be employed. However, in order to use these methods, the structure of the optical pick up must be complicated and increase in size to incorporate a plurality of edge emitting laser diodes or a mechanism to change the direction of a edge emitting laser diode. And, since an elliptical laser beam is emitted from the edge emitting laser diode, the optical system must be adjusted to change the irradiation direction of the edge emitting laser diode. For this reason, the optical pick-up is more complicated and increased in size.

In contrast to this, one light source or a plurality of light sources having different polarization directions can be formed on a compact chip by employing a surface emitting laser array so that a compact optical pick-up having compatibility with optical disks having different thicknesses can be realized. In addition, since laser beams irradiated from the surface emitting laser array are circular, even if the polarization direction is changed, the optical system need not be adjusted. With respect to this point, a compact optical pick-up which can cope with optical disks having different thicknesses and has a structure which can be easily supplied at low cost, can be provided.

As an optical pick-up according to the present invention, in a vertical cavity surface emitting laser in which a pair of reflective layers, a clad layer, an active layer, and a pair of electrode layers, are at least stacked in the emitting direction of a laser beam to form optical resonators, the polarization direction of an emitted laser beam can be controlled by controlling the distribution of an electric field of a column obtained in such a manner that a portion on a laser beam emitting side which includes the clad layer, extends in the form of a column in the emitting direction of the laser beam. When a vertical cavity surface emitting laser array which has a plurality of optical resonators is employed as laser beam sources, and the connecting direction of an electrode pair is changed with respect to the optical resonators, first or second laser beams having different polarization directions can be selectively emitted. In order to emit laser beams whose polarization directions are perpendicular to each other, an optical resonator comprising a column having an almost square section can be employed.

In addition, when a surface emitting laser array is employed as a plurality of laser beam sources forming the lateral cross sections of the columns into rectangular shapes and arranging them in different directions, laser beams whose polarization directions are perpendicular to each other can be emitted.

As another means for controlling the numerical aperture of an optical element, an optical pick-up which switchably uses first or second laser beams having different radiation angles and emitted from first or second laser beam sources, respectively, will be described below. An optical pick-up in which the effective numerical aperture of an objective lens can be changed by the radiation angles of laser beams emitted from laser beam sources, and which can perform a recording/reproducing process to optical recording media having different thicknesses, can be realized. More specifically, a laser light source for emitting a laser beam having a large radiation angle is selected to perform a process to a thin optical recording medium having a high recording density, so that the effective numerical aperture of the objective lens can be increased. Therefore, the resolution of a laser beam irradiated on the optical recording medium can be improved, and a recording/reproducing process can be performed at a high recording density. On the other hand, a laser light source for emitting a laser beam having a small radiation angle is selected for a thick optical recording medium having a low recording density, so that the effective numerical aperture of the objective lens according to the present invention can be decreased, and a beam spot can be converged to almost the diffraction limit on the thick optical recording medium having a low recording density. Therefore, a process such as a recording/reproducing process can be reliably performed. When the numerical aperture of the optical element is limited by a radiation angle, an aperture limit rate is preferably set to about 50 to 64%. In addition, when a manufacturing allowance or assembling allowance in manufacturing of the optical pick-up is considered, the aperture limit rate is more preferably set to about 56 to 60%.

In the optical pick-up according to the present invention, when laser beam sources having different radiation angles formed on a surface emitting laser array in which a plurality of laser beam sources can be formed at low cost are switchably used, a process can be reliably performed to optical recording media having different thicknesses. In addition, since the effective numerical aperture of an objective lens is controlled by a radiation angle, an optical element such as a prism, a hologram, or a hologram lens for controlling the numerical aperture of the objective lens is not required. Therefore, an inexpensive optical pick-up, which has a smaller size and can perform a process to optical recording media having different thicknesses, can be realized. In addition, since an optical element need not be newly added, an inexpensive optical system which has been used for an optical recording medium and can obtain sufficient performance can be employed. The number of optical parts and other parts constituting the optical pick-up decreases, and simple optical adjustment can be performed. Therefore, with respect to this point, an inexpensive and highly reliable optical pick-up which can reliably perform a process, such as a recording/reproducing process, can be realized. A plurality of laser beam sources can be easily formed on the surface emitting laser array at low cost and high precision by a photolithographic technique, and the laser beam sources can be monolithically formed together with other circuit elements, photo diodes for detecting light, or photo transistors. For this reason, a compact and inexpensive optical pick-up can also be realized.

As laser beam sources having different radiation angles, like the above arrangement, vertical cavity surface emitting lasers, in which a pair of reflective layers, a clad layer, an active layer, and a pair of metal layers, are at least stacked in the emitting direction of the laser beams to form an optical resonators, can be employed, and a large number of laser beam sources can be arranged in a small area. When a ratio of the diameter of the optical resonator of the vertical cavity surface emitting laser to the diameter of an aperture through which a laser beam from the optical resonator is emitted is changed, the radiation angle of the laser beam can be controlled. As other means of changing the radiation angle of the laser beam, when a waveguide is further stacked on the reflective layer on the side on which the laser beam is emitted, and at least one of the refractive index, diameter, and length of the waveguide is changed, the radiation angle can be controlled. The radiation angle can also be controlled by forming micro lenses having different refractive powers on the reflective layer on the side on which the laser beam is emitted.

Furthermore, since a plurality of laser beam sources can be easily formed on the surface emitting laser array, a first laser beam source group in which at least three laser beam sources for radiating first laser beams are aligned, and a second laser beam source group in which at least three laser beam sources for radiating second laser beams are aligned and formed by using the three-beams method which can perform tracking servo at high precision with a simple arrangement. This process can be performed to optical recording media having different recording densities, i.e., different track pitches. Since a thin optical recording medium having a high recording density has a small track pitch, a laser beam source group, in which laser beam sources are arranged at a second pitch L2 corresponding to the small track pitch, can be used. Since a thick optical recording medium having a low recording density has a large track pitch, a laser beam source group, in which laser beam sources are arranged at a first pitch L1 being different from the second pitch L2 and corresponding to the large track pitch, can be used.

By using a surface emitting laser array in which a plurality of laser beam sources can be formed by a photolithographic technique, the first and second laser beam source groups can be easily formed at low cost. For this reason, a grating for generating three beams is not required, and an optical pick-up having a simple arrangement and high precision can be realized. In addition, when a beam is split by gratings, the gratings must be arranged on optical disks having different thicknesses, respectively. However, since this arrangement cannot be realized, the different method of tracking error detection must be applied to one optical disk with an optical pick-up that is complicated and expensive. Although the method of tracking error detection other than the three-beams method can be naturally applied to both the optical disks, a signal detection element and a processing circuit tend to be more complex than those used in the three-beams method. When these first and second laser beam source groups are formed parallel to each other, the three-beams method can be applied to both the optical disks having different thicknesses, and photo detectors for detecting light can be used in both the optical disks. On the other hand, the first and second laser beam sources are arranged at different pitches in front of and behind a laser beam source which can control a polarization direction, so that the first and second laser beam source groups can be arranged in the same row.

In order to set an interval between convergent spots of a main beam and a sub-beam in the three-beams, method on the recording layer of an optical disk to an appropriate value of about 15 mm or less, and keep the pitch of the laser beam sources at about 30 mm or more, which is a minimum pitch at which the laser beam sources can be formed on the surface emitting laser array, a magnification m of the optical element is preferably set within the following range:

$$m \times (L2/L1)^3 2 \tag{A}$$

where, L2<L1.
In consideration of simplicity in the manufacturing a surface emitting laser array, the magnification m is more preferably set within the following range:

$$m \times (L2/L1)^3 8/3 \tag{B}$$

Furthermore, when a diffraction unit for diffracting reflected beams from an optical disk into ±1-order lights to converge the ±1-order lights on light detectors which are arranged around light sources, is arranged in the optical element, the laser beam sources and the light detectors can be formed on the same substrate, and the surface emitting laser array can be integrated together with the light detectors. For this reason, an optical pick-up in which photo detectors are integrated with a light source, can be realized. Therefore, several steps, such as a position adjusting step required to assemble an optical pick-up, can be omitted, and a compact and high-performance optical pick-up can be provided at low cost.

BRIEF DESCRIPTION OF THE DRAWINGS

FIGS. 13(a) and 13(b) are plan views showing the vertical cavity surface emitting laser shown in FIG. 12 when viewed from the emitting direction of the laser beam, in which FIG. 13(a) shows a laser beam source for emitting a TM-polarized light, and FIG. 13(b) shows a laser beam source for emitting a TE-polarized light.

FIGS. 14(a) and 14(b) are plan views showing another laser beam source of the vertical cavity surface emitting laser shown in FIG. 12 when viewed from the emitting direction of the laser beam, in which FIG. 14(a) shows a laser beam source for emitting a TM-polarized light, and FIG. 14(b) shows a laser beam source for emitting a TE-polarized light.

DETAILED DESCRIPTION OF THE PREFERRED EMBODIMENTS

Embodiments of the present invention will be described below with reference to the accompanying drawings.

First Embodiment

Figure 1:
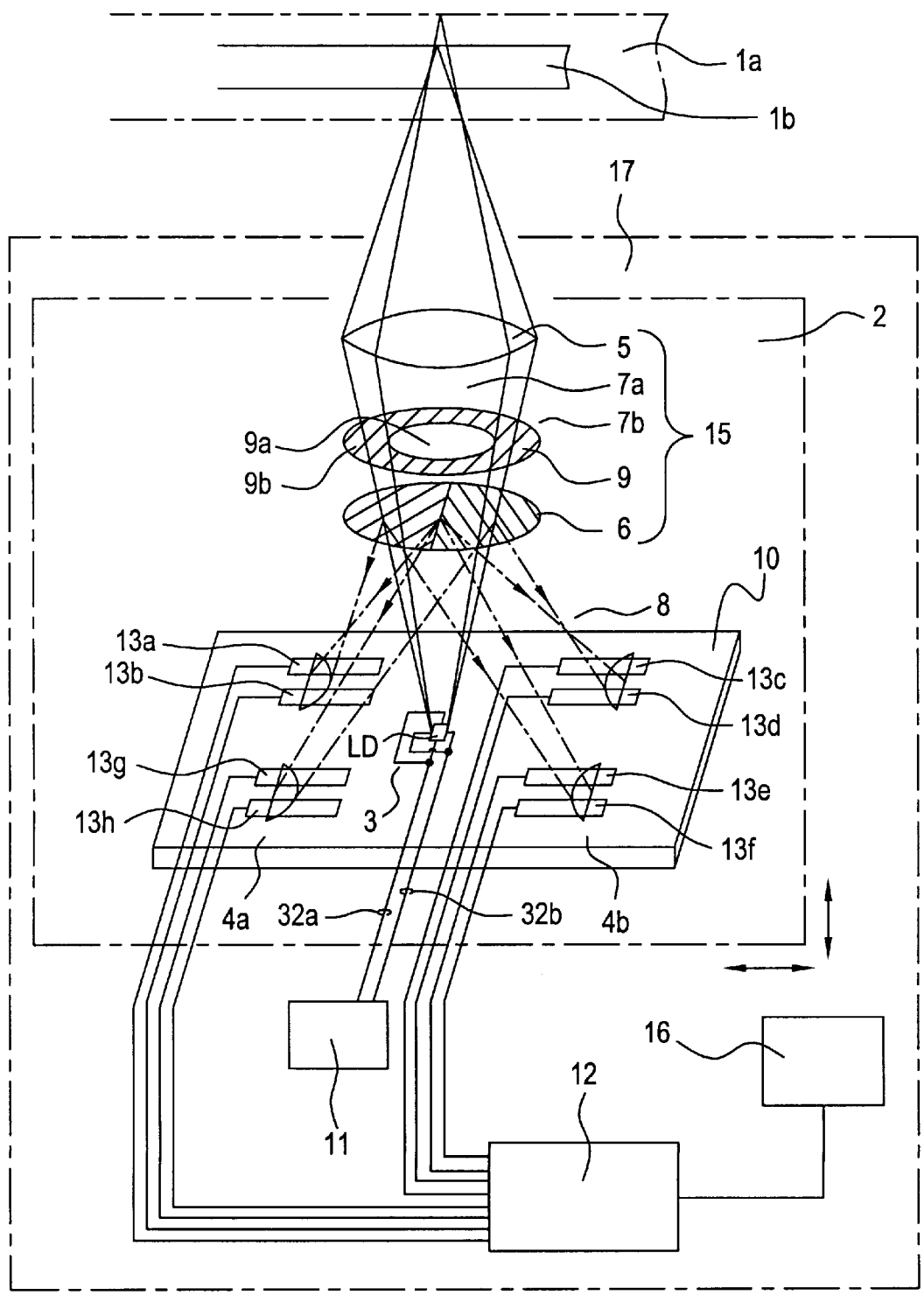
FIG. 1 is a schematic view showing the arrangement of an optical pick-up according to the first embodiment of the present invention.

FIG. 1 shows the brief arrangement of an optical pick-up 2 which can perform a recording/reproducing process to a thick optical disk 1a having a low recording density according to the CD standard and a thin optical disk 1b having a high recording density according to the DVD standard, and the brief arrangement of a optical recording system 17 in which the optical pick-up 2 is employed. The optical pick-up 2 according to this embodiment, comprises an integrated device 10 in which a surface emitting laser 3, serving as a light source, and a photo detector array for signal detection 4 using photo diodes serving as light detectors, are monolithically formed on a single substrate (e.g., n-type GaAs substrate). A laser beam 7 emitted from the surface emitting laser 3 is converged on the recording layer of an optical disk 1 through a hologram 6, a polarization dependent optical element (polarizer) 9, and an objective lens 5, which constitutes an optical element 15 of the optical pick-up 2 according to this embodiment, and a reflected beam 8 from the recording layer that passes through the optical element 15 again to be converged on the photo detectors. The laser beam 7 emitted in a polarization direction determined by a laser controller 11, passes through the hologram 6, and is converged on the recording layer of the optical disk 1 by the objective lens 5. The reflected beam 8 reflected from the recording layer of the optical disk 1 is incident on the objective lens 5 through the same optical path as described above to be diffracted by the hologram 6, and the ±1-order beams of the diffracted reflected beam, are converged on the photo detector array 4 of the integrated device 10, such that an conspicuous astigmatic aberration is generated. Signals obtained by the photo detector array 4 are arithmetically operated by an arithmetic operation circuit 12. On the basis of the arithmetic result, the optical pick-up 2 is positionally controlled by an actuator using an electromagnetic force such that a tracking error or a focusing error is minimized.

In the integrated device 10, the surface emitting laser 3 serving as a laser beam source LD for emitting a laser beam is arranged near the center, and photo detector arrays 4a and 4b arranged in two rows are formed on both the sides of the surface emitting laser 3. Pairs of electrodes 32a and 32b whose opposite sides are paired are connected to the laser beam source LD. As will be described later, when the electrodes 32a and 32b are switched by the laser controller 11, the polarization direction of the laser beam 7 emitted from the laser beam source LD can be controlled. Here, in general, a pit recorded on an optical disk has a long and narrow shape along a track direction. When the pit width is shorter than a wavelength, linearly polarized light perpendicular to a pit length direction, i.e., perpendicular to the track direction (to be referred to as TM-polarized light) has the degree of modulation of a reproduced signal larger than that of linearly polarized light perpendicular to the TM-polarized light (to be referred to as TE-polarized light). Therefore, TM-polarized light is preferably used to perform a recording/reproducing process to the optical disk 1b having a high recording density, and TE-polarized light is preferably used for the optical disk 1a having large recording pits. For this reason, in the following description, the electrode 32a is selected to perform a recording/reproducing process to the thick optical disk 1a having a low recording density according to the CD standard, and a TE-polarized laser beam 7a mainly having a TE-polarized light component is emitted from the laser beam source LD. When the electrodes 32b are selected to perform a recording/reproducing process to the optical disk 1b having a high recording density and a thin substrate according to the DVD standard, a TM-polarized laser beam 7b mainly having a TM-polarized light component is emitted from the laser beam source LD. As a matter of course, laser beams having the polarized light components opposite to the above light components can also be selected for the CD standard and the DVD standard.

Figure 2:
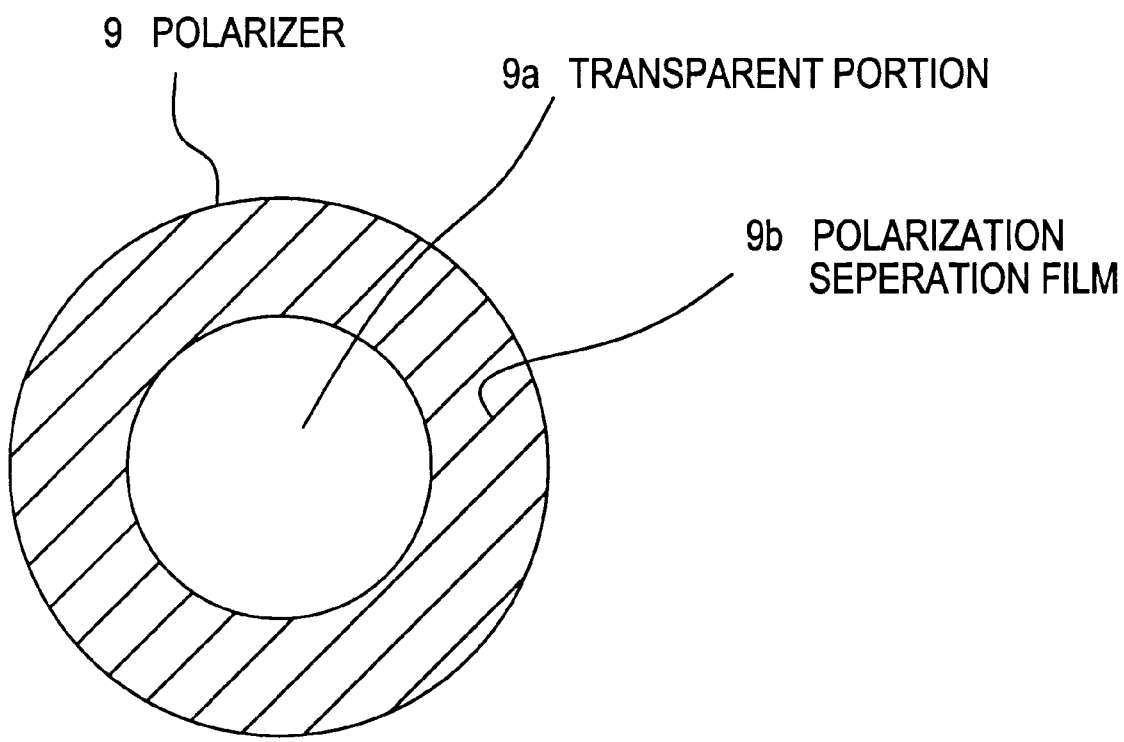
FIG. 2 is an enlarged view showing a polarizer used in the optical pick-up in FIG. 1 when viewed from an optical axis direction.

In the optical pick-up 2 of this embodiment, the polarizer 9 is arranged on the optical path between the laser beam source LD and the objective lens 5. In this polarizer 9, as shown in the enlarged view in FIG. 2, a central portion 9a is a circular transparent portion (i.e., a portion from which a polarization separation film is removed) having high transmittance with respect to both the TE-polarized light and the TM-polarized light, and the peripheral portion 9b serves as polarization separation film in which the transmittance with respect to TE-polarized light is almost zero. Such a polarization dependent optical element can be constituted by using, for example, an absorption type organic polarization filter. This filter is formed such that a polymer film containing an organic dye is extended to arrange molecules. A polarization dependent optical element can also be constituted by a polarization filter obtained by stacking films having birefringence, a polarization filter obtained by dispersing metal needles on a transparent substrate, a birefringent grating polarizer, or the like. In the optical pick-up 2 of this embodiment, the TE-polarized laser beam 7a is emitted from the laser beam source LD onto the thick optical disk 1a according to the CD standard. In this case, a portion of the TE-polarized laser beam 7a transmits through the aperture 9a at the center of the polarizer 9, and a portion of the TEpolarized laser beam 7a corresponding to the peripheral portion 9b does not reach the objective lens 5. Therefore, the TE-polarized laser beam 7a decreases an effective numerical aperture NA of the objective lens 5, and the effective numerical aperture NA is set to about 0.35 in this embodiment. On the other hand, the TM-polarized laser beam 7b is emitted from the laser beam source LD onto the thin optical disk 1b according to the DVD standard. Since the TM-polarized laser beam 7b almost entirely transmits through the polarizer 9, the numerical aperture NA of the objective lens 5 is equal to a design value. The objective lens of this embodiment is optimally designed for the thin optical disk 1b according to the DVD standard, and the objective lens is designed such that the effective numerical aperture NA is set to about 0.6 with respect to the laser beam 7 having a wavelength of about 650 nm.

In the integrated device 10, the photo detector arrays 4a and 4b are arranged in two rows on both the sides of the laser beam source LD to detect the reflected beam 8. Four strip-shaped photo diodes 13a, 13b, 13g, and 13h and four strip-shaped photo diodes 13e, 13f, 13c, and 13d are formed on the photo detector arrays 4a and 4b, respectively, to obtain, from the reflected beam 8, a focusing error signal for performing focusing servo, a tracking error signal for performing tracking servo, and data signal for obtaining information recorded on an optical disk. The ±1-order lights of the reflected beam 8 divided in the tangential direction of the track of the optical disk 1 are converged on these photo diodes 13a to 13h to generate conspicuous astigmatic aberration by hologram 6. Therefore, the optical intensities of the beams are converted into signal strengths by the photo diodes 13a to 13h, and the signals are calculated by the arithmetic operation circuit 12 to be output. The arithmetic results of the arithmetic operation circuit 12 are transmitted to the position controller 16, and the optical pick-up 2 is positionally controlled such that a tracking error and a focusing error are minimum. For example, a focusing error signal FES is arithmetically operated by using the signal strengths obtained by the photo diodes 13a to 13h in the following manner:

$$\{(13a+13b)+(13c+13d)\}-\{(13g+13h)+(13e+13f)\} \quad (1)$$

On the other hand, a tracking error signal TES can be calculated by a push-pull method using the difference between the optical strengths of the reflected beams in the areas separated in the tangential direction. The tracking error signal TES is arithmetically operated in the following manner:

$$\{(13a+13b)+(13e+13f)\}-\{(13c+13d)+(13g+13h)\}-(2)$$

The tracking error signal TES can be also calculated by a differential phase tracking method using a signal strength representing the difference between light intensities of diagonal portions of the areas divided by 4 in the tangential direction and the radial direction with respect to the track of the optical disk. The tracking error signal TES is arithmetically operated in the following manner:

$$\{(13b+13c)+(13e+13h)\}-\{(13a+13d)+(13f+13g)\}(3)$$

According to the push-pull method or the differential phase tracking method, a tracking error signal can be obtained regardless of the track pitch of the optical disk. Therefore, the optical pick-up 2 having compatibility with the optical disk 1b having a high recording density, and the optical disk 1a having a low recording density, can be realized.

In addition, a data signal RFS can be obtained from the total sum of the photo diodes 13a to 13h. The data signal RFS is arithmetically operated in the following manner:

$$(13a+13b+13c+13d+13e+13f+13g+13h) \quad (4)$$

In the optical pick-up 2 according to the embodiment described above, when the optical disk 1b having a high recording density and a thin substrate is set, the TM-polarized laser beam 7b is emitted from the laser beam source LD of the surface emitting laser 3 and converged on the recording layer of the optical disk 1b by the objective lens 5. The objective lens 5 of this embodiment is optimally designed such that light can be converged to the diffraction limit on the recording layer of the thin optical disk 1b when a numerical aperture NA is 0.6. Therefore, by using the TM-polarized laser beam 7b, a laser beam emitted from the laser beam source LD almost entirely transmits through the polarizer 9 to be converged on the optical disk 1b with high focusing performance. Therefore, since the reflected beam 8 having high resolution can be obtained, the optical disk 1b according to the DVD standard can be stably positionally controlled at high precision, and a recording/reproducing process can be reliably performed.

On the other hand, when a process is performed to the thick optical disk 1a having a low recording density by using the optical pick-up 2 of this embodiment, the TE-polarized laser beam 7a is emitted from the laser beam source LD of the surface emitting laser 3. The laser beam 7a is stopped down by the aperture 9a of the central portion of the polarizer 9 to be incident on the objective lens 5. Therefore, for the objective lens 5 of this embodiment, the optical system of an optical pick-up is designed such that the effective numerical aperture NA is set to 0.35 with respect to the TE-polarized laser beam 7a. Since the objective lens 5 is optimally designed for a thin optical disk having a substrate thickness of 0.6 mm and a high recording density, when the objective lens 5 is used for a thick optical disk having a substrate thickness of 1.2 mm and a low recording density, a spherical aberration is generated, and imaging performance is degraded. However, in the optical pick-up 2 of this embodiment, an effective numerical aperture NA is set to a small value of 0.35 with respect to the thick optical disk 1a having a low recording density. A spherical aberration generated by the difference between substrate thickness is in proportion to the 4th power of the numerical aperture NA. Therefore, when the numerical aperture is decreased, a spherical aberration sharply decreases even if the substrate thicknesses are different from each other. For this reason, the optical pick-up 2 of this embodiment can form a convergent spot obtained by converging the TE-polarized laser beam 7a to almost the diffraction limit on the thick optical disk 1a having a substrate thickness of 1.2 mm, and the influence of the substrate thickness error on an spherical aberration can be considerably decreased. At this time, the diameter of the convergent spot is increased by a decrease in the numerical aperture. However, since the information recording density of the thick optical disk 1a is lower than that of the thin optical disk 1b, the diameter of the convergent spot is sufficient.

Figure 3A:
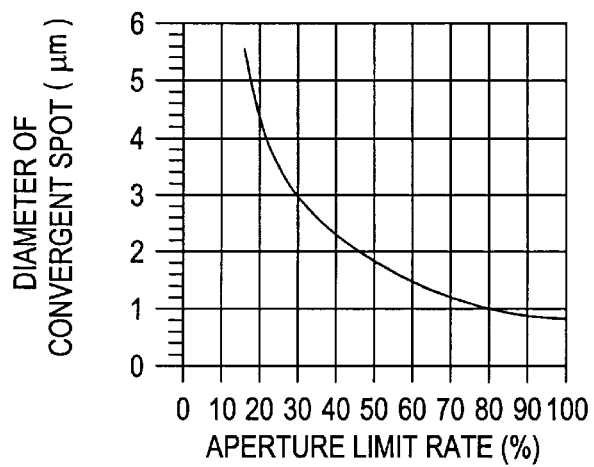
FIGS. 3(a), 3(b) and 3(c) are graphs showing a change in diameter of a convergent spot obtained by an objective lens on the recording surface of a CD when the CD is reproduced, such that the diameter of the transparent portion of the polarizer to change an effective numerical aperture (FIG. 3(a)), a change in wave aberration of the convergent spot (FIG. 3(b)), and a result obtained by measuring a jitter value of a 3T signal serving a shortest pit (FIG. 3(c)), respectively.
Figure 3B:
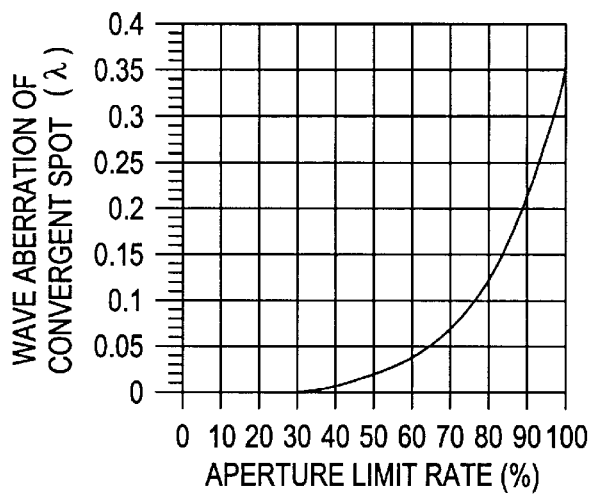

In this manner, in the optical pick-up of this embodiment, when the polarizer 9 is used for the thick optical disk 1a, the effective numerical aperture NA of the objective lens 5 is decreased, and the numerical aperture of the optical element 15 of the optical pick-up 2 according to this embodiment is limited to a specific value. Therefore, the reflected beam 8 having high resolution can be obtained through the optical element 15. For this reason, a recording/reproducing process can be reliably performed to an optical disk having a low recording density. FIG. 3(a) shows a manner in which, when a beam (TE-polarized laser beam) for reproducing a CD is incident on the objective lens 5, a change to the diameter of the transparent portion 9a of the polarizer 9 changes the effective numerical aperture, and the diameter of a convergent spot formed by the objective lens 5 onto the recording surface of the CD 1a changes. FIG. 3(b) shows a manner in which the wave aberration of the convergent spot changes depending on the change in diameter. Here, the convergent spot diameter is set to a diameter at which the strength of the main lobe of the convergent spot is set to $1/e^2$ of the peak value. FIG. 3(a) shows a manner in which the convergent spot diameter changes as a function of the rate of aperture limit (aperture limit rate) by the polarizer 9, as plotted on a graph. When the aperture limit rate is increased to decrease the effective numerical aperture, the convergent spot diameter decreases as shown in FIG. 3(a), and accordingly the wave aberration increases as shown in FIG. 3(b). A wave aberration in an optical pick-up is generally regulated to 0.071 l or less to a wavelength l as rms (root means square) by the Marecial Criterion. Of the allowed wave aberration, about 0.05 l is allowed as a wave aberration generated by the substrate of a CD. For this reason, the wave aberration of the optical system of the optical pick-up must be set to 0.05 l or less. Therefore, with reference to the measurement result in FIG. 3(b), in order to satisfy this condition, the aperture limit rate is desirably set to about 64% or less.

Figure 3C:
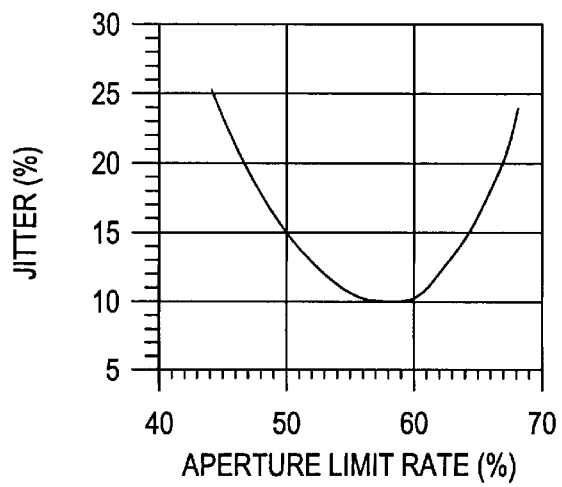

FIG. 3(c) shows a result obtained by measuring a jitter value of a 3T signal serving as a shortest pit when the CD 1a is reproduced while an aperture limit rate is changed. Here, as the jitter value, a value obtained by standardizing the value of the standard deviation of a distribution by an window width is set. A jitter value at which a BER (Bit Error Rate) of $10^{-5}$ or less is obtained, is 15%. For this reason, as is apparent from the measurement result shown in FIG. 3(c), the aperture limit rate is preferably set to about 50% or more. Therefore, in consideration of changes in wave aberration and the jitter value as a function of the aperture limit rate, it is understood that the aperture limit rate by the polarizer 9 is preferably set to about 50 to 64%. In consideration of an allowance in manufacturing and assembling the optical pick-up 2, the aperture limit rate is more preferably set to about 56% to 60%. According to these results, in the optical pick-up of this embodiment, about 58% is employed as the limit rate of the numerical aperture of the polarizer 9, and the numerical aperture of 0.6 set for a DVD is stopped down to 0.35 for a CD.

In this manner, the optical pick-up 2 of this embodiment is an optical pick-up having high compatibility with the high-recording-density optical disk 1b and the low-recording-density optical disk 1a which are different from each other in thickness, track pitch, and the like. In addition, since the optical pick-up 2 can cope with the optical disks 1a and 1b by changing the polarization direction of the laser beam, the optical pick-up 2 is realized as an inexpensive and compact optical pick-up in which a simple optical system having high reliability is employed. Control for the polarization direction of a laser beam can be performed by only switching electrodes of the surface emitting laser 3 connected to the laser beam source LD. This control can be achieved by an extremely simple controller and has high reliability.

In order to form a light source for irradiating a plurality of laser beams having different polarization directions, a plurality of conventional edge emitting laser diodes are prepared and arranged in different directions to make it possible to obtain the light source. However, it is very difficult to arrange a plurality of semiconductor laser chips in a small space. These semiconductor chips must be connected to each other to be operated, and an optical system for an elliptical laser beam obtained from an edge emitting laser diode must be adjusted. In assembling an optical pick-up, the positional relationship between the irradiation positions of the plurality of semiconductor chips and a photo detector array for detecting reflected laser beams must be adjusted.

In contrast to this, the optical pick-up 2 of this embodiment employs the surface emitting laser 3 as a laser beam source as described above. In this surface emitting laser, a plurality of laser beam sources are two-dimensionally arranged to be integrated as a matter of course, and a laser beam is irradiated perpendicularly to the substrate but from the edge. For this reason, as described above, it is easy to monolithically arranging the laser beam sources and light detectors such as photo diodes on a single substrate. In particular, a vertical cavity surface emitting lasers (to be referred to as VCSELs hereinafter) in which resonant paths are formed perpendicularly to the substrate, constitute a two-dimensional array and the degrees of density and in-plane arrangement are high. For this reason, the vertical cavity surface emitting laser is one of the light sources which are most suitable for the optical pick-up according to the present invention.

Figure 4:
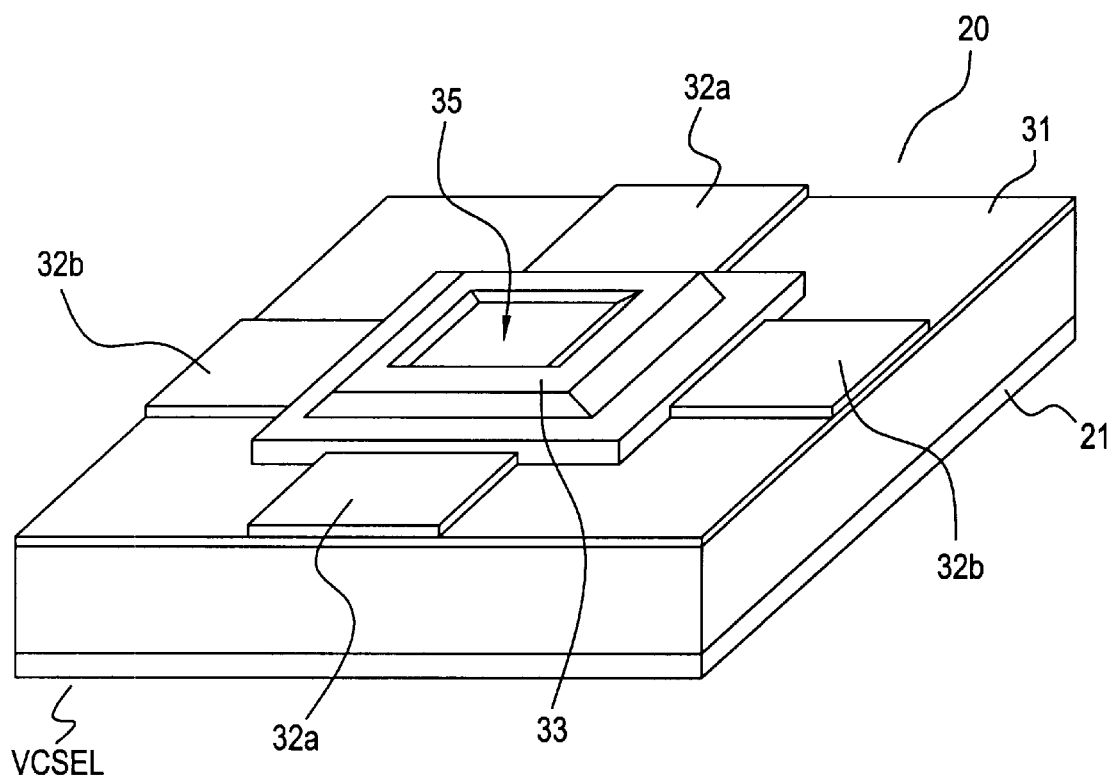
FIG. 4 is a perspective view showing the outline of a vertical cavity surface emitting laser used in the optical pick-up in FIG. 1.
Figure 5:
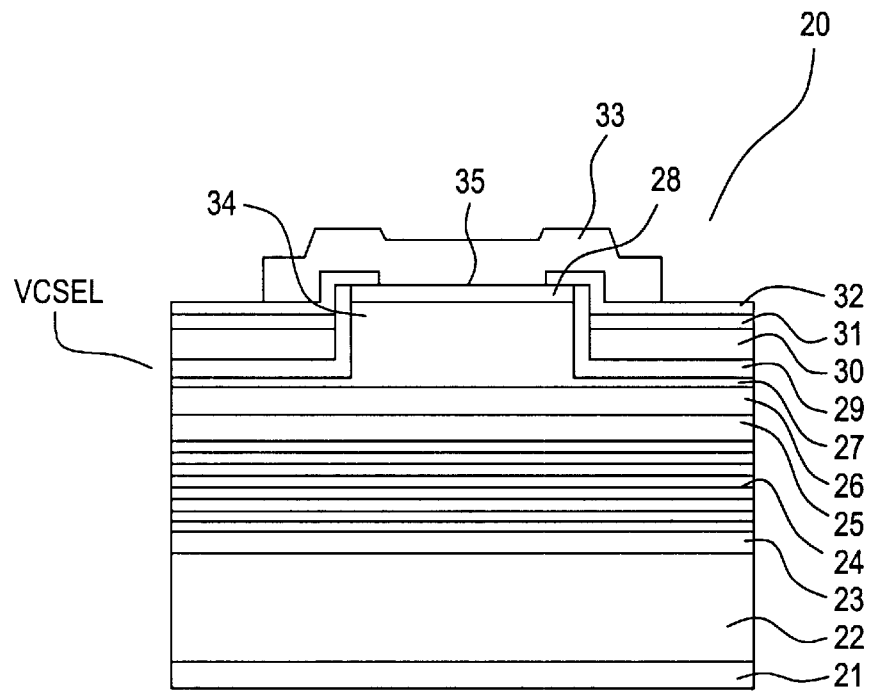
FIG. 5 is a sectional view showing an arrangement of the vertical cavity surface emitting laser shown in FIG. 4.
Figure 6:
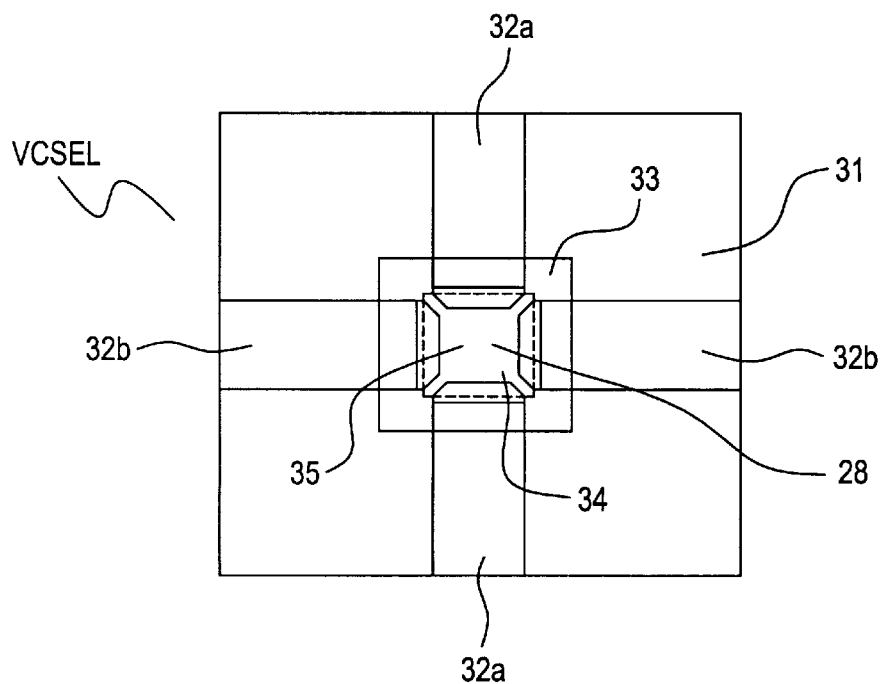
FIG. 6 is a plan view showing the vertical cavity surface emitting laser shown in FIG. 5 when viewed from the emitting direction of a laser beam.

FIG. 4 shows the outline of a VCSEL, and FIG. 5 shows an arrangement of the VCSEL by using the cross sectional view. FIG. 6 shows the appearance of the VCSEL of this embodiment when viewed from the emitting side of a laser beam. The VCSEL of this embodiment comprises a optical resonator 20 in which a plurality of semiconductor layers are stacked between metal layers 21 and 32. In the optical resonator 20, an n-type GaAs buffer layer 23, sixty (60) pairs of semiconductor distributed Bragg reflectors 24 each constituted by an n-type AlAs layer and an n-type $Al_{0.5}Ga_{0.5}As$ layer and having a reflectance of 99% or more with respect to light having a wavelength of about 650 nm, an n-type $Al_{0.7}Ga_{0.3}As$ clad layer 25, a multi-quantum well active layer 26 constituted by five $n^-$-type $Ga_{0.5}In_{0.5}P$ well layers and $n^-$-type $(Al_{0.5}Ga_{0.5})_{0.5}In_{0.5}P$ barrier layers, a p-type $Al_{0.7}Ga_{0.3}As$ clad layer 27, and a p-type $Al_{0.2}Ga_{0.8}As$ contact layer 28, are sequentially stacked on an n-type GaAs substrate 22 from the bottom. Epitaxial growth using the MOVPE method or epitaxial growth using the MBE method can be used to form these stacked layers. Eight (8) pairs of dielectric multilayer reflectors 33 each constituted by a first layer, e.g., an $SiO_x$ layer such as $SiO_2$ and a second layer, e.g., a $TaO_x$ layer such as $Ta_2O_5$ and having a reflectance of 98.5% or more with respect to light having a wavelength of about 650 nm, are formed on the area which sufficiently cover an exposed surface 35 (to be referred to as an aperture hereinafter) of the contact layer 28 on the emitting side.

In the VCSEL of this embodiment, the contact layer 28 and a part of the clad layer 27 are etched into an almost square shape when viewed from the upper surface of the resonator 20, (i.e., the emitting side) to form a column 34, and this column 34 serves as a resonant portion. When the lateral cross section of the column 34 parallel to the substrate 22 is formed into an almost square shape, the direction of the polarization direction of a laser beam emitted from the oscillation area of the column 34 is along one of two orthogonal sides of the square.

In addition, the periphery of the column 34 is buried with a first insulative layer 29 constituted by a silicon oxide film ($SiO_x$ film), such as an $SiO_2$ film formed by a thermal CVD method, and a metal layer 30 consisting of a metal, such as a gold-zinc alloy. The first insulative layer 29 is continuously formed along the p-type $Al_{0.5}Ga_{0.5}As$ clad layer 27 and the surface of the contact layer 28, and the metal layer 30 is formed to bury a portion around the first insulative layer 29. A second insulative layer 31 constituted by a silicon oxide film ($SiO_x$ film), such as an $SiO_2$ film formed by a spattering method, is formed on the surface of the metal layer 30. The metal layer (upper electrode) 32 consisting of, for example, Cr and a gold-zinc alloy is formed on the second insulative layer 31 to be in contact with the contact layer 28. The contact metal layer 32 serves as an electrode for current injection. In this embodiment, the upper electrode 32 is divided by 4 into two pairs of electrodes 32a and 32b, and the pairs of electrodes 32a and 32b are formed to be in contact with the respective sides of the column 34 as shown in FIG. 6. The interior of the upper electrode 32 serves as the aperture 35. In the surface emitting laser VCSEL of this embodiment, a current is injected from the upper electrode 32 and is guided to the active layer 26 to be converted into light. The light is amplified by the resonator, and the laser beam is emitted from the aperture 35 to the outside. Referring to FIGS. 4, 5, and 6, for descriptive convenience, the VCSEL having one column 34 is shown. However, a plurality of columns may be arranged in the surface of the substrate, as a matter of course. A plurality of optical resonators 20 each having the above arrangement can also be easily combined to each other in the form of an integrated array.

In the optical pick-up of this embodiment, TE-polarized and TM-polarized laser beams can be selectively emitted from the VCSEL by switching the pairs of upper electrodes 32a and 32b. A manner of emitting laser beams having different polarization directions will be described below with reference to FIG. 6.

FIG. 6 is a schematic view showing the VCSEL of this embodiment when viewed from a side on which a laser beam is emitted. In the VCSEL of this embodiment, the upper electrodes 32 are formed along the respective sides of the contact layer 28 having a square shape. Each opposite upper electrode 32 serves as the pairs of electrodes 32a and 32b. Here, in the VCSEL of this embodiment, when a laser is driven by using only the pair of upper electrodes 32a, a current from two sides of the square contacting the pair of upper electrodes 32a is guided to the active layer 26 while being dispersed toward the central portion of the square, thereby performing laser oscillation. When the laser is driven by using only the pair of upper electrodes 32b, a current from two sides perpendicular to two sides of the square contacting the upper electrodes 32a is similarly guided to the active layer 26 while being dispersed toward the central portion of the square, thereby performing laser oscillation.

When laser oscillation is performed as described above, the lateral cross section of the column 34 is square, and the pairs of upper electrodes 32a and 32b are symmetrically formed. Therefore, there are no differences in the characteristics of the VCSEL such as threshold current, wallplug efficiency, and the like which are performed when the VCSEL is driven by using only the pair of upper electrode 32a or the pair of upper electrode 32b.

However, the influence on the distribution of electric field near the interface at the inside and the periphery of the column 34 of the optical resonator 20 when using only the pair of upper electrodes 32a, is different from that when only using the pair of upper electrodes 32b. More specifically, when the VCSEL is not driven, due to the metal layer 30 formed around the column 34, the distributions of electric field around the column 34 are equal to each other with respect to the respective sides of the square. The polarization direction of a laser beam which can exist inside the column 34, is along one of orthogonal sides and cannot be controlled.

In contrast to this, when a current is injected into the VCSEL by using the pair of upper electrodes 32a, a distribution of electric field near the interface of the column 34 changes. Inside the column 34, an electric field perpendicular to the sides contacting the pair of upper electrodes 32a easily exists. Therefore, the polarization direction of light transmitted through the inside the column 34 is equal to a direction perpendicular to the sides of the square contacting the pair of upper electrodes 32a. As a result, the polarization direction of an emitter laser beam has a direction in which an electric field easily exists (i.e., the direction of the pair of upper electrodes 32a), and the TE-polarized laser beam 7a is emitted.

On the other hand, the polarization direction of a laser beam emitted when a current is injected into the VCSEL by using the pair of upper electrodes 32b, has a direction perpendicular to the direction of the laser beam (TE-polarized light) obtained by using the pair of upper electrodes 32a (i.e., to be TM-polarized light), because the sides of the square contacting the pair of upper electrodes 32b are perpendicular to the sides contacting the pair of upper electrodes 32a. As a result, when a current is supplied to the VCSEL by using the pair of upper electrodes 32b, the TM-polarized laser beam 7b polarized in the direction of the pair of upper electrodes 32b, is emitted.

In this manner, in the VCSEL of this embodiment, when the pair of upper electrodes 32a or the pair of upper electrodes 32b are selected to inject a current, the polarization direction of an emitted laser beam can be controlled, and TE-polarized or TM-polarized laser beams can be selectively emitted. In addition, when the lateral sectional shape of the column 34 is made square, the laser beams form orthogonal polarization directions. For this reason, laser oscillations can be stably performed.

As described above, in the optical pick-up of this embodiment, a laser beam source which can selectively irradiate laser beams having different polarization directions, is realized by using a vertical cavity surface emitting laser. The optical element 15 comprises a polarizer 9 having an aperture formed therein and arranged between the laser beam source 3 and the objective lens 5. For this reason, by selecting only the electrode of the surface emitting laser diode to change the polarization direction of a laser beam, the effective numerical aperture NA of the objective lens 5 is controlled for optical disks having different thicknesses, and the numerical aperture of the optical element 15 can be changed. Therefore, a beam spot having high resolution can be converged on any optical disks having a different thickness. For this reason, the servo function of the optical pick-up can be utilized, and a recording/reproducing process can be reliably performed to optical disks having different thicknesses. Therefore, data processing can be reliably performed to a plurality of optical disks having different recording densities.

Furthermore, in the optical pick-up of this embodiment, laser beams having different polarization directions are selectively irradiated on optical disks having different thicknesses and different track pitches to obtain a reflected beam having high resolution. For this reason, the optical pick-up does not require a process of splitting one laser beam into a plurality of focusing points to be converged as in a conventional pick-up, and a simple optical system having high reliability can be applied to the optical pick-up. Since the optical pick-up does not require an optical element such as a prism or a hologram for splitting a laser beam, the optical pick-up having compatibility with optical disks having different thicknesses can be decreased in size and weight. In addition, since the optical pick-up of this embodiment employs, as a light source, a new vertical cavity surface emitting laser which can switch polarization directions and can be easily integrated, the optical pick-up can be further decreased in size, and have a considerably simple structure and high performance.

When this optical pick-up is compared with a conventional optical pick-up in which two focusing points are always formed by an objective lens, the following merits are found. As has been described above, since the conventional optical pick-up always has two beam spots converged by the objective lens, when a focus drawing operation is to be performed, the focus drawing operation may be erroneously performed at a beam spot for reproducing a thin optical disk in place of a thick optical disk. In addition, when a thick optical disk is to be performed, a beam spot for reproducing a thin optical disk exists. Since the optical spot is not focused on the recording surface of the optical disk, the optical spot may be dispersed and finally incident on photo detectors for signal detection as stray rays to make noise. In contrast to this, in the optical pick-up of this embodiment, when an optical disk is determined, a beam spot converged by the objective lens is only a beam spot for reproducing the determined optical disk, and a beam spot for another optical disk is not formed. For this reason, a focus drawing mechanism need not be complicated, and there is no probability that an erroneous operation is performed. In addition, stray rays are not generated and a highly precise optical pick-up can be realized with a simple arrangement.

Since the optical pick-up of this embodiment does not split a laser beam into two beams to converge two focusing points as the conventional pick-up, when a TM-polarized laser beam is irradiated on a thin optical disk, laser power can be prevented from being decreased, and a decrease in laser power of TE-polarized light can be prevented except for only a decrease in laser power caused by absorption or diffraction by a polarization separation film. In addition, a switching operation of polarization directions can be reliably performed by very simple control, such as selection of pairs of electrodes as described above. Therefore, an optical pick-up which can cope with optical disks having a plurality of specifications can be provided with an inexpensive arrangement having high reliability.

Second Embodiment

Figure 7:
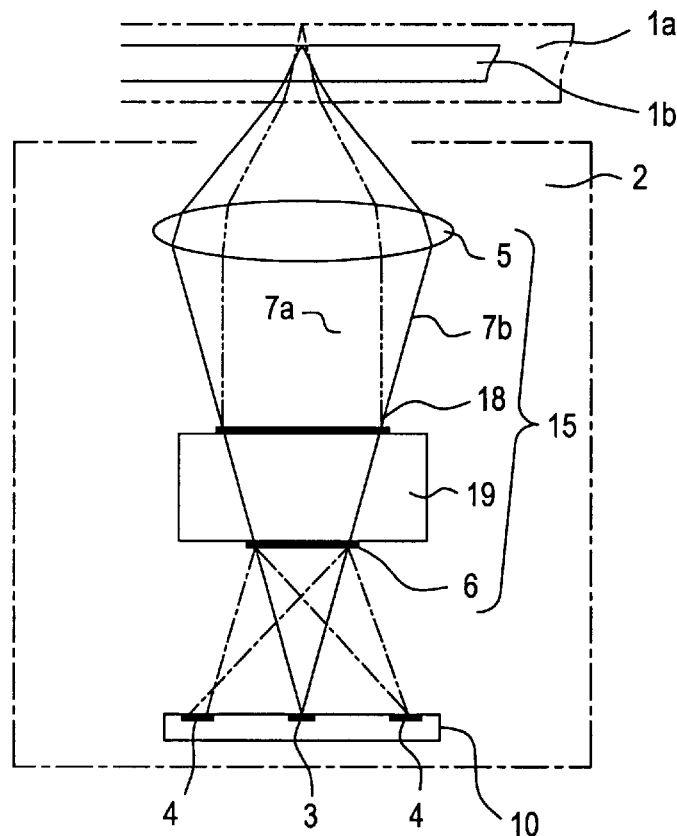
FIG. 7 is a schematic view showing an optical pick-up according to the second embodiment of the present invention.

FIG. 7 shows the second embodiment of an optical pick-up 2 which can perform a recording/reproducing process to a thick optical disk 1a having a low recording density according to the CD standard and a thin optical disk 1b having a high recording density according to the DVD standard. The optical pick-up 2 according to this embodiment, comprises an integrated device 10 in which surface emitting lasers 3 serving as light sources, are arrayed to form a plurality of laser beam sources. The surface emitting laser array 3 and a photo detector array 4 for signal detection using photo diodes serving as light detectors are monolithically formed on a single substrate. A laser beam 7 emitted from the surface emitting laser array 3 is converged by an objective lens 5 on the recording layer of an optical disk 1 through a hologram 6 of an optical element 15. A reflected beam 8 reflected from the recording layer of the optical disk 1, is incident on the objective lens 5 of the optical element 15 through the same optical path as described above and diffracted by the hologram 6. The ±1-order beams of the diffracted reflected beam are converged on the photo detector array 4 of the integrated device 10 such that a conspicuous astigmatic aberration is generated. Therefore, the optical recording system shown in FIG. 1 can also be provided by using the optical pick-up 2 of this embodiment. A description of the arrangement of the optical recording system will be omitted. As in the first embodiment, since a surface emitting laser is used in the second embodiment, the sectional shape of the emitted beam is almost circular. For this reason, unlike an optical element of an optical pick-up using a edge emitting laser diode, a prism or lens for shaping a beam is not required, and the optical system can be simplified. In addition, since the beam shaping prism is not required, a factor that generates an aberration and a factor that increases production cost can be removed, the compact, light-weight, and inexpensive optical element 15 having high precision can be employed.

In the optical pick-up 2 of this embodiment, the hologram 6 is formed on one surface of a hologram element 19, and a polarized hologram 18 having refractive power is formed on the other surface of the hologram element 19. Therefore, the optical element of this embodiment comprises the hologram 6, the polarized hologram 18 having refractive power, and the objective lens 5. In the polarized hologram 18 of this embodiment, a polarized Fresnel-zone plate having positive power to a TE-polarized laser beam is formed. For this reason, in the polarized hologram 18 of this embodiment, when a TE-polarized laser beam 7a is irradiated from the laser beam source 3, the TE-polarized laser beam 7a passes through the polarized hologram 18 such that a radiation angle decreases. On the other hand, the polarized hologram 18 has no power to a TM-polarized laser beam 7b. As a result, when the TE-polarized laser beam is irradiated, an effective numerical aperture NA of the objective lens 5 decreases. Power of the polarized hologram 18 of this embodiment with respect to the TE-polarized laser beam is selected such that a limit rate of the effective numerical aperture NA of the objective lens 5 is set to about 58% as in the above embodiment. The aperture limit rate of the polarized hologram 18 of the optical pick-up 2 according to this embodiment is preferably set to about 50 to 64% as in the polarizer 9 of the optical pick-up described above, and more preferably set to about 56% to 60%.

Figure 8:
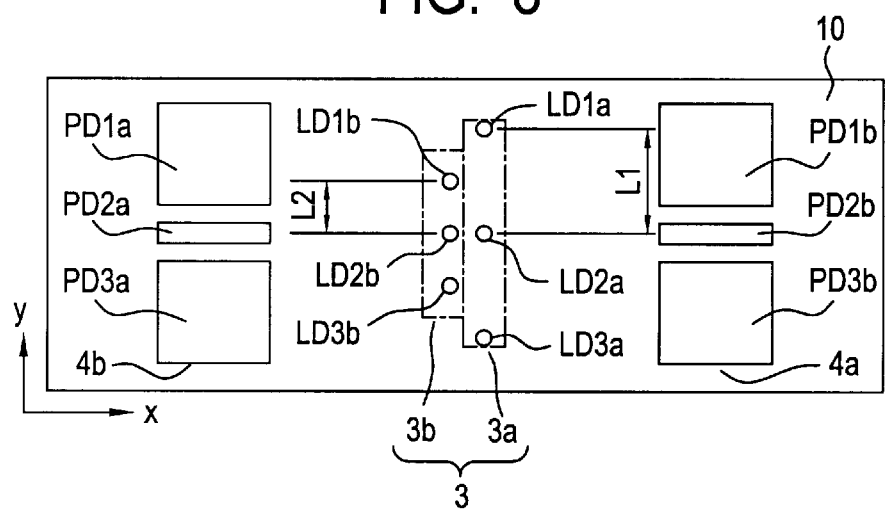
FIG. 8 is a view showing the arrangement of the surface of an integrated device of the optical pick-up in FIG. 7.

FIG. 8 is an enlarged view showing a plane arrangement of the integrated device 10 of this embodiment. The integrated device 10 of the embodiment comprises a surface emitting laser array 3 in which a plurality of laser beam sources LD for emitting laser beams are formed in two rows near the center of the integreted device 10. A first laser beam source group 3a, on the right of the surface emitting laser array 3, is a laser beam source group for performing a recording/reproducing process to the optical disk 1a having a thick substrate and a low recording density according to the CD standard. Three laser beam sources LD1a, LD2a, and LD3a constituting the laser beam source group 3a are arranged at a pitch L1 corresponding to the track pitch (1.6 mm) of the optical disk 1a according to the CD standard. A second laser beam source group 3b arranged parallel to the first laser beam source group 3a is a laser beam source group for performing a recording/reproducing process to the optical disk 1b having a thin optical disk and a high recording density according to the DVD standard. Three laser beam sources LD1b, LD2b, and LD3b constituting the second laser beam source group 3b are arranged at a pitch L2 corresponding to the track pitch (0.74 mm) of the optical disk 1b according to DVD standard. Therefore, a ratio of pitches L1:L2 is almost equal to 1.6:0.74.

In addition, the three laser beam sources LD1a, LD2a, and LD3a constituting the first laser beam source group 3a are arranged such that a TE-polarized laser beam having a wavelength of about 650 nm can be irradiated. The radiation angle of the emitted laser beam is decreased by the above polarized hologram 18, so that the effective numerical aperture NA of the objective lens 5 is set to about 0.35. On the other hand, the laser beam sources LD1b, LD2b, and LD3b constituting the second laser beam source group 3b are arranged such that a TM-polarized laser beam having a wavelength of about 650 nm can be irradiated. Since the TM-polarized light passes through the polarized hologram 18, the effective numerical aperture NA of the objective lens 5 is set to about 0.6.

On both the sides of the first and second laser beam source groups 3a and 3b, two rows of photo detector groups 4a and 4b for detecting reflected beams are arranged parallel to the first and second laser beam source groups 3a and 3b. Three photo diodes PD1a, PD2a, and PD3a and three photo diodes PD1b, PD2b, and PD3b are arranged in the photo detector groups 4a and 4b such that a tracking error signal is obtained by the three-beams method in correspondence with laser beam sources LD1 to LD3. The surface emitting laser arrays and the diode groups described above can be formed at high precision in a fine space by a photolithographic technique. The surface emitting laser arrays and the diode groups can be formed on a single integrated device 10 and then provided.

In the optical pick-up 2 of this embodiment, signals from these photo diodes are supplied to the arithmetic operation circuit 12 shown in FIG. 1, to arithmetically operate a tracking error signal, or the like, and a position controller 16 positionally controls the optical pick-up 2. In the optical pick-up 2 of this embodiment, a tracking error signal TES is arithmetically operated in the following manner by using signals obtained by the photo diodes PD1a, PD3a, PD1b and PD3b:

$$TES = (PD1a + PD1b) - (PD3a + PD3b) \quad (5)$$

On the other hand, a focusing error signal FES can be obtained from the difference between the intensities of ±1-order light of the reflected beams 8 which are converged on the first photo detector array 4a and the second photo detector array 4b, such that a conspicuous astigmatic aberration is generated by the hologram 6. The focusing error signal FES is arithmetically operated by the following equation:

$$FES = PD2a - PD2b \quad (6)$$

In addition, a data signal RFS representing data recorded on the optical disk 1a or 1b can be calculated on the basis of the intensity of the reflected beam 8. The data signal RFS is arithmetically operated by the following equation:

$$RFS = PD2a + PD2b \quad (7)$$

In the optical pick-up 2 of this embodiment, when the optical disk 1b having a high recording density and a thin substrate is set, the second laser beam source group 3b of the surface emitting laser array 3 is selected, and laser beams 7b are irradiated from the three laser beam sources LD1b, LD2b, and LD3b constituting the second laser beam source group 3b. The central laser beam source LD2b of these laser beam sources serves as a main beam source for outputting a data signal and a focusing error signal by an astigmatic aberration method, and the laser beam sources LD1b and LD3b arranged on both the sides of the laser beam source LD2b serve as sub-beam sources for outputting tracking error signals by the three-beams method. The laser beams 7b emitted from the laser beam sources LD1b, LD2b, and LD3b are converged on the recording layer of the optical disk 1b by the objective lens 5.

Figure 9:
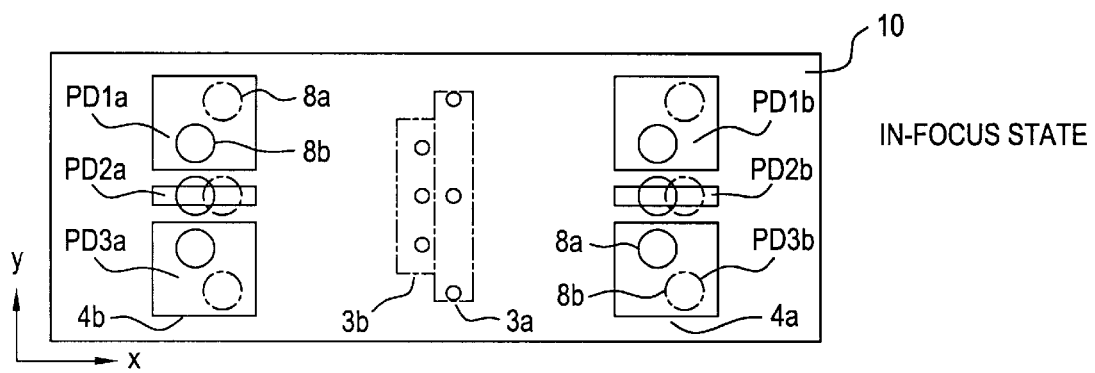
FIG. 9 is a view showing a convergent state of a reflected beam in an in-focus state of the optical pick-up shown in FIG. 7.
Figure 10:
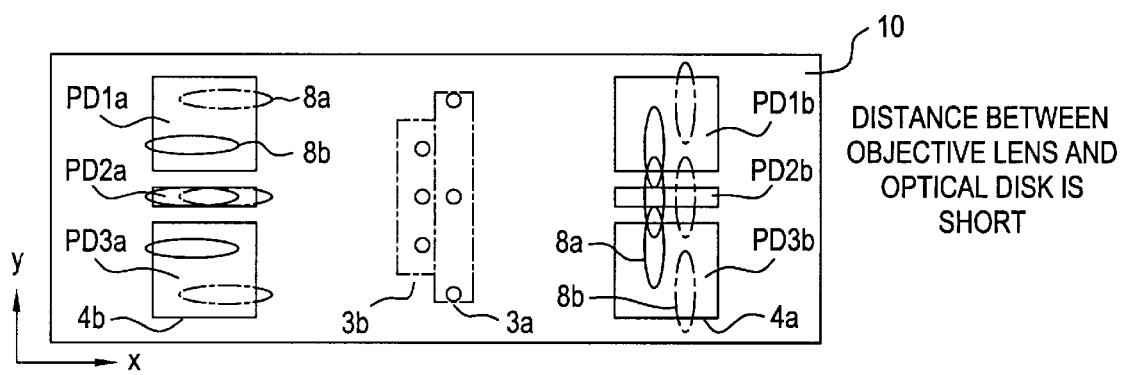
FIG. 10 is a view showing a convergent state of a reflected beam in a state wherein the optical pick-up shown in FIG. 7 is close to an optical disk.
Figure 11:
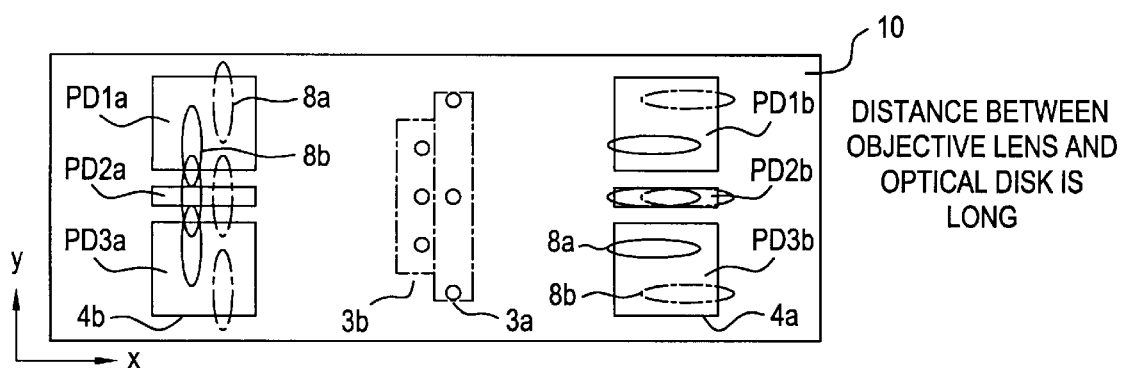
FIG. 11 is a view showing a convergent state of a reflected beam in a state wherein the optical pick-up shown in FIG. 7 is far from an optical disk.

FIGS. 9, 10, and 11 show a manner in which reflected beams 8b reflected from the optical disk 1b, are converged on the photo detector arrays 4a and 4b in an in-focus state, a state wherein the objective lens 5 and the optical disk 1b are close to each other, and a state wherein the objective lens 5 and the optical disk 1b are far from each other, respectively. As is apparent from these drawings, signal strengths obtained from the photo detectors PD2a and PD2b on which ±1-order beams are converged, are uniformed in the infocus state shown in FIG. 9. On the other hand, when the focal points are offset from each other, as shown in FIGS. 10 or 11, the signal strengths obtained from the photo detectors PD2a and PD2b are nonuniformed. For this reason, a convergent state is obtained as a focusing error signal FES. A focusing servo operation is performed on the basis of this signal, and the servo operation can be reliably performed. When a tracking error occurs, signal strengths obtained from the photo diodes PD1a, PD1b, PD3a, and PD3b for detecting the sub-beams are nonuniformed. For this reason, this state is obtained as the tracking error signal TES, and a tracking servo operation can be performed on the basis of this signal.

In order to detect a focusing error signal, the hologram 6 pattern-designed in the following manner is used. That is, a main beam and sub-beams reflected from the optical disk 1a or 1b are diffracted to ±1-order diffraction, and the optical axes of these beams are changed to generate a conspicuous astigmatic aberration. In this embodiment, for example, a pattern along a hyperbola group or a corrected hyperbola group is used as the pattern of a grating, and the grating is arranged such that ±1-order diffracted light is parallel to the longitudinal direction (x axis) of the device 10. Therefore, when the objective lens 5 is close to the optical disk 1a or 1b, as shown in FIG. 10, the spot of ±1-order diffracted light converged on the photo diodes PD1a, PD2a, and PD3a has an elliptical shape having a major axis parallel to the x axis, and the spot of −1-order diffracted light converged on the photo diodes PD1b, PD2b, and PD3b has an elliptical shape having a major axis parallel to the y axis. In contrast to this, when the objective lens 5 and the disk 1a or 1b are far from each other, as shown in FIG. 11, the spot of +1-order diffracted light has an elliptical shape having a major axis parallel to the y axis, and the spot of −1-order diffracted light has an elliptical shape having a major axis parallel to the x axis. Therefore, as described above, amounts of light received by the photo diodes PD2a and PD2b change, and a focusing error signal FES can be obtained.

In addition, as shown in FIG. 8, the photo diodes PD2a and PD2b formed on the device 10 of this embodiment are arranged on the same straight line as that of the laser beam sources LD2a and LD2b to form a rectangle having long sides parallel to the straight line. The length of the long side of the rectangle is sufficiently longer than the interval between the laser beam sources LD2a and LD2b. Therefore, when the thick optical disk 1a is to be reproduced, or when the thin optical disk 1b is to be reproduced, a focusing error signal can be detected by common photo detectors. In addition, when the wavelength of a beam emitted from the surface emitting laser array 3 is offset, or when the distance between the surface emitting laser array 3 and the hologram 6 on the optical axis is offset, the spots of ±1-order diffracted lights converged on the photo diodes PD2a and PD2b, only moves on the x axis. For this reason, the spots can be reliably caught. Therefore, as in the device 10, when the photo diodes PD2a and PD2b are arranged in a rectangle having long sides parallel to the x axis, the precision of the wavelength of a light source, the assembly precision of the light source, a nd the like, can be moderated. This is advantageous to manufacturing an optical pick-up.

The photo detection areas of the photo diodes PD1a, PD3a, PD1b, and PD3b for detecting a tracking error signal are sufficiently large. Each photo detection area has an almost square shape having a side whose length is equal to the length of the long side of the photo diode PD2a or PD2b. Therefore, as in detection for a focusing error signal, the photo diodes PD1a, PD3a, PD1b, and PD3b can be used to detect the tracking error signals from both the thick optical disk (disk according to the CD standard) 1a and the thin optical disk (disk according to the DVD standard) 1b. The precision of the wavelength of the laser beam source and the assembly precision of the laser source can be also moderated.

The laser beam sources LD1b, LD2b, and LD3b are arranged in the surface emitting laser array 3b of this embodiment at intervals corresponding to the track pitch of an optical disk having a high recording density. In addition, the objective lens 5 of this embodiment is optimally designed such that the effective numerical aperture NA is set to 0.6 for the laser beam 7b emitted at a predetermined radiation angle from the second laser beam source group 3b, and the laser beam 7b can be converged to the diffraction limit on the recording layer of the thin optical disk 1b. Therefore, since the laser beam 7b emitted from the second laser beam source group 3b is converged on the recording layer to obtain a reflected beam having high resolution, a conspicuous tracking error signal TES, and a tracking servo operation can be reliably performed. For this reason, positional control can be stably performed at high precision to the thin optical disk 1b having a high recording density, and a recording/reproducing process can be reliably performed.

On the other hand, when a process is performed by using the optical pick-up 2 of this embodiment to the thick optical disk 1a having a low recording density, the first laser beam source group 3a of the surface emitting laser array is selected, and laser beams 7a are irradiated from the three laser beam sources LD1a, LD2a, and LD3a constituting the first laser beam source group 3a. The central laser beam source LD2a of these laser beam sources serves as a main beam source for outputting a data signal and a focusing error signal by an astigmatic aberration method, and the laser beam sources LD1a and LD3a arranged on both the sides of the laser beam source LD2a serve as sub-beam sources for outputting tracking error signals by a three-beams method. The laser beams 7b emitted from the laser beam source group are converged on the recording layer of the optical disk 1b by the objective lens 5.

A reflected beam 8a reflected from the optical disk 1a (according to the CD standard) is converged like the reflected beam 8b as indicated by the broken lines in FIGS. 9, 10, and 11, and a data signal and a focusing error signal can be obtained. In addition, in the first laser beam source group 3a, the laser beam sources LD1a, LD2a, and LD3a are arranged at a pitch corresponding to the optical disk 1a having a large track pitch and a low recording density. For this reason, a tracking error signal can also be obtained by the three-beams method with respect to the optical disk 1a. The objective lens 5 of this embodiment is designed such that the effective numerical aperture NA is set to about 0.35 when the radiation angle of TE-polarized light emitted from the first laser beam source group 3a is decreased. Therefore, although the objective lens 5 is optimally designed for a thin optical disk having a substrate thickness of 0.6 mm and a high recording density, the numerical aperture of the optical element 15 is decreased for a thick optical disk having a substrate thickness of 1.2 mm and a low recording density so that the laser beam 7a can be converged to almost the diffraction limit, and a focusing operation and a tracking servo operation can be performed to the optical disk 1a having a large track pitch and a low recording density by using the same control system as that used for the optical disk 1b having a small track pitch and a high recording density. In addition, the radiation angle of the laser beam 7a is decreased by the polarized hologram 18, so that the effective numerical aperture NA of the objective lens 5 can be decreased. For this reason, a spherical aberration by a substrate thickness is suppressed from being generated, and the reflected beam 7a having high resolution can be obtained. Therefore, a recording/reproducing process can be performed to the optical disk having a low recording density.

In this manner, the optical pick-up 2 of this embodiment is also an optical pick-up having compatibility with the high-recording-density optical disk 1b and the low-recording-density optical disk 1a which are different from each other in thickness and track pitch. In addition, for example, when the optical pick-up 2 of this embodiment only selects the first or second laser beam source 3a or 3b on the basis of a selection signal from a laser controller 11 in the optical recording system shown in FIG. 1 to change the polarization direction of a laser beam irradiated on an optical disk, the optical pick-up 2 can cope with the optical disks 1a and 1b. For this reason, the optical system which can be prevented from being complicated and has high reliability, can be employed, and an inexpensive and compact optical pick-up having high performance can be provided. In the optical pick-up of this embodiment, since laser power is not reduced, a recording/reproducing process can be performed with low power consumption.

Furthermore, in this embodiment, by utilizing the advantage of the surface emitting laser array in which a plurality of laser beam sources corresponding to the track pitches of the respective optical disks 1a and 1b, can be formed in a small area by using the photolithographic technique, so that an optical pick-up which can obtain tracking error signals by using a three-beams method with respect to the optical disks 1a and 1b and has a very small size and a simple arrangement is realized. According to the three-beams method, a stable tracking error signal can be obtained, and a simple control system can be used. For this reason, the three-beams method is used in many optical pick-ups for CD. However, when an optical element such as a prism is used to form three required beams, it is impractical that a considerably complex optical system is required to cope with the track pitches of two different types of optical disks. Therefore, even if the three-beams method is applied one optical disk, a different optical system must be applied to the other optical disk. For this reason, the control system is considerably complicated. In contrast to this, in the optical pick-up 2 of this embodiment, two groups of laser beam sources 3a and 3b corresponding to the respective optical disks 1a and 1b are formed in the surface emitting laser array, so that an optical element for forming three beams can be omitted. At the same time, the three-beams method can be applied to the different types of optical disks, and tracking and focusing control can be performed by a single control system. In addition, since the surface emitting laser array 3 is employed, a total of six laser beam sources constituting the two groups of laser beam sources 3a and 3b can be arranged in a very small space.

In the optical pick-up of this embodiment, since the laser beam sources for outputting the main beam and the sub-beams are separated from each other, the laser beam for detecting an information signal and a focusing error signal and the laser beam for detecting a tracking error signal, can be emitted at different times. When an optical disk is to be reproduced, the flow of processes is executed in the following rough order: that is, the optical disk is determined, the surface emitting lasers corresponding to the optical disk are turned on, focus drawing and focusing control are performed, tracking control is performed, laser beams are moved to a desired address, and an information signal is reproduced. Therefore, when only the main beam is turned on until tracking control is started, a sub-beam can be prevented from being mixed in the photo diodes PD2a and PD2b, and highly precise focusing control can be performed. The arithmetically operated tracking error and focusing error signals are supplied to, for example, a position controller 13 shown in FIG. 1. The optical pick-up 2 is moved by an actuator in a direction perpendicular to the recording surface of the optical disk or a radial direction of the optical disk, and control for converging a laser beam to a target pit on the recording track of the optical disk to form a fine spot, is performed.

According to the three-beams method, the convergent spots of sub-beams are arranged in front of and behind the convergent spot of a main beam in the track direction. For this reason, since a time difference is generated between the signals of the two sub-beams, abnormality of a tracking error signal may occur when the beam spots pass through cracks or defects on the disk. In order to suppress an influence caused when the abnormality of the tracking error signal occurs, the interval between the convergent spots of the main beam and the sub-beam is preferably set to 15 mm or less. On the other hand, when the interval between the convergent spots is decreased, the pitches L1 and L2 of the laser beam sources decrease. In particular, the pitch L2 of the laser beam sources 3b corresponding to the optical disk 1b according to the DVD standard, considerably decreases. The range in which two adjacent emitting portions of the surface emitting laser array 3 can be closest to each other, is determined by a cross sectional shapes of the columns constituting the optical resonators of the emitting portions parallel to the semiconductor substrate. Since the size of a general cross section is 10 to 30 mm, the minimum interval between the adjacent laser beam sources, i.e., the pitch L2 of the laser beam sources 3b is preferably set to 30 mm or more.

Assume that a magnification m of the optical element 15 of this embodiment is a ratio (f1/f2) of an optical length f1 between an object surface (light source) and an object side principle point (after the optical elements such as the objective lens 5 and the polarized hologram 18 constituting the optical element 15 are combined to each other) of the optical element 15, and an optical length f2 of an image (optical disk 1) side principal point of the optical element 15. In this case, the relationship between the pitch L1 of the first laser beam source group 3a for CD in which an interval between convergent spots increases, and an allowable interval (15 mm) between the convergent spots, is as follows:

$$15 \times m = L1 \text{ (mm)} \quad (8)$$

Therefore, when it is considered that the ratio of the pitch L1 of the first laser beam source group 3a and the pitch L2 of the second laser beam source group 3b is equal to the ratio of the track pitches of the optical disks 1a and 1b, the pitch L2 of the second laser beam source group 3b is given by:

$$15 \times m \times (L2/L1)^3 30 \text{ mm}, m \times (L2/L1)^3 2 \quad (9)$$

i.e.,

Since the track pitch of the CD standard is 1.6 mm, and the track pitch of the DVD standard is 0.74 mm, the pitch ratio L2/L1 is given by 0.74/1.6. Therefore, it is understood that as an optical element for an optical pick-up having compatibility with both the DVD standard and the CD standard, an optical system having a magnification m of 4.4 or more is desirably used.

Furthermore, in consideration of the facility of manufacturing a surface emitting laser array, the minimum interval between laser beam sources is more preferably set to about 40 mm or more. For this reason, it is more desirable that the magnification m of the optical system satisfies the following relationship:

$$15 \times m \times (L2/L1)^3 40 \text{ mm}, m \times (L2/L1)^3 8/3 \quad (10)$$

i.e.,

Therefore, as an optical element for an optical pick-up having compatibility with both the DVD standard and the CD standard, an optical element having a magnitude m of 5.8 or more is more preferably used.

The magnification m of the optical element 15 can be replaced with the magnification of the objective lens 5, because the influence of the optical elements, such as the polarized hologram 18, constituting the optical element 15 (except for the objective lens 5) can be almost neglected. As a concrete example, when the wavelength of a laser beam emitted from the surface emitting laser array 3 is set to 650 nm, an objective lens which has a numerical aperture of 0.6, and a finite system having a magnification m of 6 and is optimally designed for DVD, can be used. The surface emitting laser array 3 in which the pitch L1 of the first laser beam source group 3a for CD is 90 mm and the pitch L2 of the second laser beam source group 3b for DVD is 41.6 mm can be applied to the objective lens 5. Therefore, an optical pick-up, having such preferable optical performance that the interval between the convergent spots of a main beam and a sub-beam for CD obtained by the objective lens 5, is set to 15 mm, and the interval between the convergent spots of a main beam and a sub-beam for DVD is set to 6.9 mm. The interval (e.g., the distance between the laser beam sources LD2a and LD2b) between the first laser beam source group 3a and the second laser beam source group 3b is set to 40 mm.

Furthermore, the objective lens 5 employed in the optical pick-up 2 of this embodiment is designed such that an aberration can be corrected to an image height of ±50 mm to make it possible to moderate manufacturing precision or assembling precision. Since the magnification m of the objective lens 5 of this embodiment is 6, the objective lens 5 can allow the light source to be offset from the optical axis by a maximum of ±300 mm. Therefore, when the intermediate point obtained by connecting the laser beam sources LD2a and LD2b located at the centers of the first and second laser beam source groups 3a and 3b, is defined as an optical axis, although it is considered that the laser beam source LD1a or LD3a which is maximally offset from the optical axis by 93 mm, laser beams emitted from all the light sources of all the first and second laser beam source groups, can be converged by the objective lens 5 of this embodiment on the recording surface of a CD or DVD to almost the diffraction limit.

In the optical pick-up 2, a plurality of laser beam sources must be arranged to use the three-beams method to process disks having different specifications, and the surface emitting laser described above, is optimally selected. In particular, in a vertical cavity surface emitting laser (to be referred to as a VCSEL hereinafter), the concentration of a two-dimensional array and the degree of freedom of an in-plane arrangement are high. The VCSEL may be most suitable for the optical pick-up 2 of this embodiment.

Figure 12:
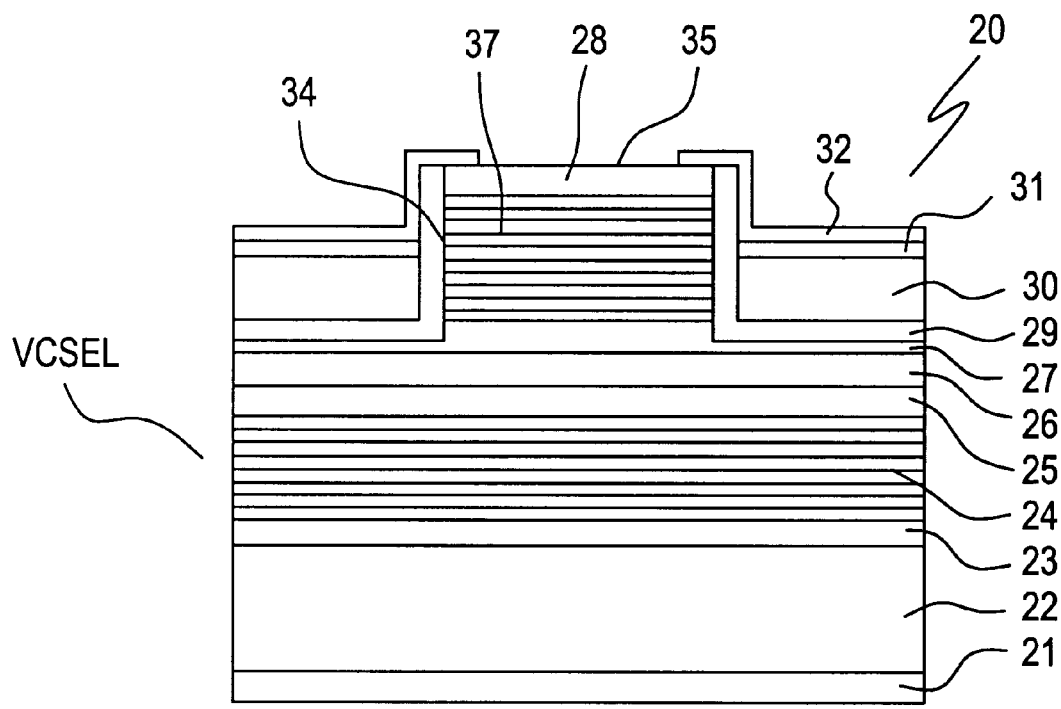
FIG. 12 is a sectional view showing an arrangement of a vertical cavity surface emitting laser used in the optical pick-up shown in FIG. 7.

FIG. 12 shows the arrangement of the VCSEL of this embodiment by using its cross sectional view. The VCSEL of the embodiment is different from the VCSEL shown in FIG. 5 in that a pair of reflective mirrors for forming an optical resonator 20 are constituted by semiconductor Bragg reflectors. The remaining arrangement of the VCSEL of the embodiment is that of the VCSEL in FIG. 5. More specifically, in the optical resonator 20, an n-type GaAs buffer layer 23, 60 pairs of semiconductor distributed Bragg reflectors 24 each constituted by an n-type AlAs layer and an n-type $Al_{0.5}Ga_{0.5}As$ layer and having a reflectance of 99% or more with respect to light having a wavelength of about 650 nm, an n-type $Al_{0.7}Ga_{0.3}As$ clad layer 25, a multi-quantum well active layer 26 constituted by five n⁻-type $Ga_{0.5}In_{0.5}P$ well layers and n⁻-type $(Al_{0.5}Ga_{0.5})_{0.5}In_{0.5}P$ barrier layers, a p-type $Al_{0.7}Ga_{0.3}As$ clad layer 27, 50 pairs of semiconductor distributed Bragg reflectors 37 each constituted by a p-type AlAs layer and a p-type $Al_{0.5}Ga_{0.5}As$ layer and having a reflectance of 98.5% or more with respect to light having a wavelength of about 650 nm, and a p-type $Al_{0.2}Ga_{0.8}As$ contact layer 28 are sequentially stacked on an n-type GaAs substrate 22 from the bottom. Epitaxial growth using the MOVPE method or epitaxial growth using the MBE method can be used to form these stacked layers.

In the VCSEL of this embodiment, as shown in FIG. 13, the contact layer 28, the semiconductor distributed Bragg reflectors 37, and a part of the clad layer 27 are etched into an almost rectangular shape when viewed from the upper surface of the resonator 20, i.e., the emitting side to form a column 34, and this column 34 serves as a resonant portion. When the lateral cross section of the column 34 parallel to the substrate 22 is formed into an almost rectangular shape, the interface condition between the column 34 and a distribution of electric field around the column 34 changes, an electric field in a direction parallel to a short side 34a inside the column 34 easily exists. Therefore, the polarization direction of light transmitted through the inside of the column 34 is parallel to the short side 34a, and the polarization direction of a laser beam to be emitted has a direction in which an electric field easily exists.

Figure 13A:
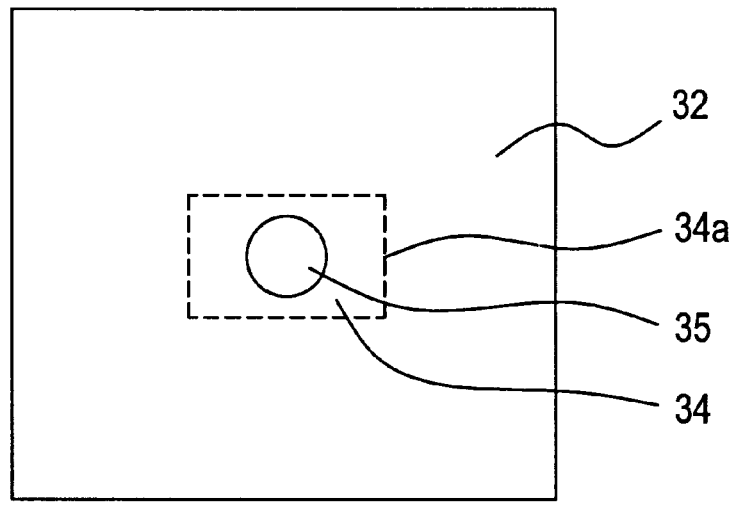
Figure 13B:
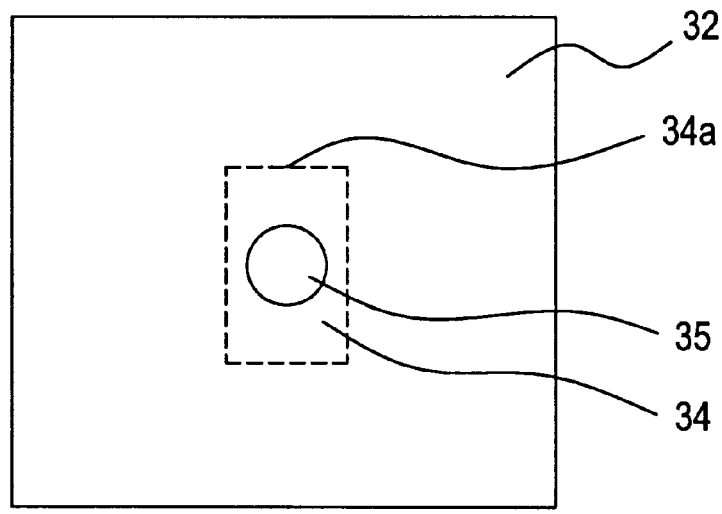

As a result, when a surface emitting laser array in which the column 34 is arranged in the direction shown in FIG. 13(a) is employed as the laser beam sources LD1a, LD2a, and LD3a constituting the first laser beam source group 3a, the TE-polarized laser beam 7a can be emitted. On the other hand, when a surface emitting laser array in which the column 34 is arranged in a direction (shown in FIG. 13(b) perpendicular to the direction in FIG. 13(a) is used as the laser beam sources LD1b, LD2b, and LD3a constituting the second laser beam source group 3b, the TM-polarized laser beam 7b can be emitted. In this manner, when the laser beam sources LD having the columns 34 whose directions change depending on a polarization direction are arranged, the polarization direction of an emitted laser beam can be freely set by the specification of the optical disk to be processed. A laser beam irradiated from the edge emitting laser diode is a light flux having an elliptical section. However, since a laser beam is emitted from the surface emitting laser VCSEL as a light flux having a symmetrical shape, the optical system need not be adjusted even if the polarization direction changes.

As in the first embodiment described above, pairs of electrodes 32a and 32b which are separately connected to the contact layer, can also be used. This example is shown in FIG. 14. In this example, the column 34 is etched into a square shape when viewed from the emitting side of the laser beam, and the pairs of upper electrodes 32a and 32b are formed along the respective sides of the contact layer 28. In this example, as in the description of the first embodiment, a metal layer 29 is formed around the column 34. For this reason, the distributions of electric field around the column 34 are equal to each other with respect to the sides of the square.

In this example, since the clad layer 27, the semiconductor distributed Bragg reflectors 37, and the contact layer 28 are stacked on the active layer 26, the distance between the active layer 26 and the upper electrodes 32 is longer than that in the structure described in the first embodiment. Therefore, in the structure of this embodiment, when a method of influencing the distribution of electric field around the column 34 shown in the first embodiment to control a polarization direction is employed, an electric field given by the upper electrodes 32 is not easily transmitted through the periphery of the column immediately above the active layer 26. In this embodiment, to obtain easier control, the material of the upper electrodes 32 is selected and the contact resistance between the upper electrodes 32 and the contact layer 28 is increased. When the contact resistance is increased, and a current is caused to flow in the upper electrodes 32, portions where the upper electrodes 32 are in contact with the contact layer 28 can be slightly increased in temperature.

When the surface emitting laser VCSEL having the above arrangement is driven by using only the pair of upper electrodes 32a, the contact portions of the upper electrodes 32a has a temperature slightly higher than that of the contact portions of the upper electrodes 32b. At this time, the column 34 is slightly distorted by the temperature difference, and the square shape is changed into a rectangular shape extending in the directions of the sides contacting the upper electrodes 32a. As a result, the boundary condition of the distribution of electric field around the column 34 changes, and an electric field in a direction perpendicular to a side of the square contacting the upper electrodes 32b easily exists inside the column 34. Therefore, the polarization direction of light transmitted through the inside of the column 34 is equal to the direction perpendicular to the side of the square contacting the upper electrodes 32b, and the polarization direction of a laser beam to be emitted has a direction in which the electric field easily exists. Similarly, a current is injected into the surface emitting laser diode by using the upper electrodes 32b. The polarization direction of a laser beam to be emitted is perpendicular to the direction of the polarization direction of the laser beam obtained by using the upper electrodes 32a because the sides of the square contacting the upper electrodes 32b are perpendicular to the sides of the square contacting the upper electrodes 32a.

Figure 14A:
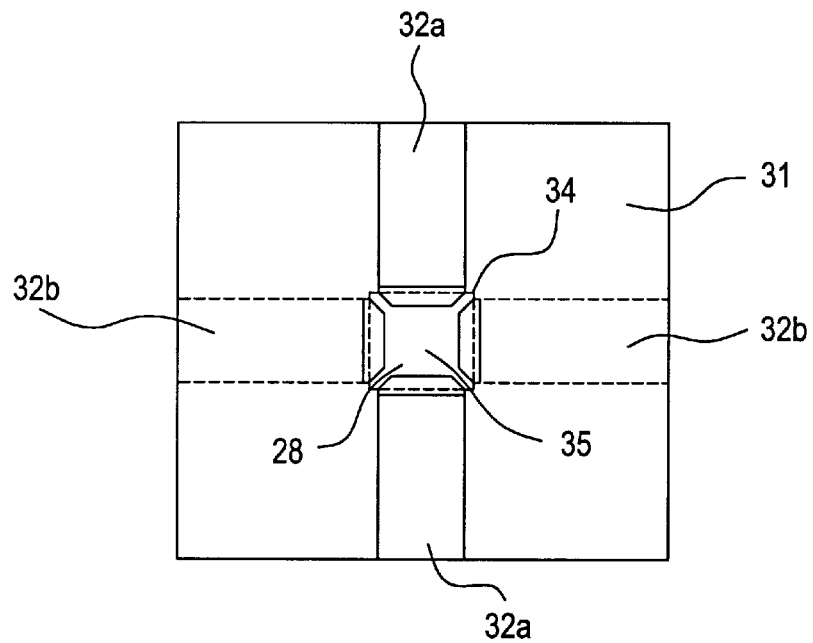
Figure 14B:
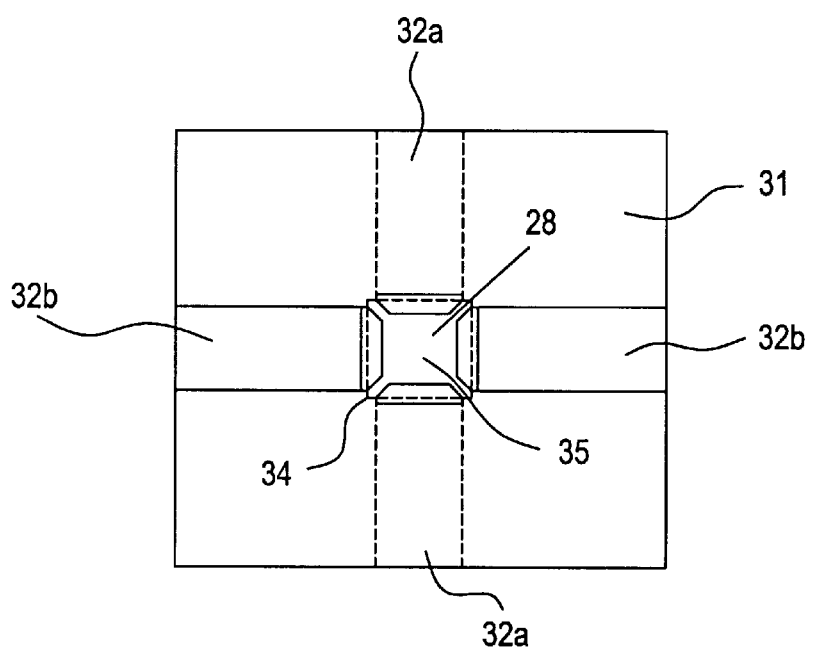

Therefore, in the optical pick-up of this embodiment, as the laser beam sources LD1a, LD2a, and LD3a constituting the first laser beam source group 3a for emitting TE-polarized light, as shown in FIG. 14(a), a surface emitting laser using the pair of upper electrodes 32a can be employed. On the other hand, as the laser beam sources LD1b, LD2b, and LD3b constituting the first laser beam source group 3b for emitting TM-polarized light, as shown in FIG. 14(b), a surface emitting laser using the pair of upper electrodes 32b can be employed. In the VCSEL, only one of the required pairs of electrodes 32a or 32b may be formed, or both the pairs of electrodes 32a and 32b may be formed, and only a required pair of electrodes may be wired. In this manner, the first and second laser beam source groups 3a and 3b can be constituted by using laser beam sources LD having different polarization directions, and the polarization direction of a laser beam to be emitted can be freely set depending on the specification of the optical disk to be processed.

In the laser beam sources obtained by the surface emitting laser diodes as described above, there are no differences in the characteristics of the VCSEL such as threshold current, wallplug efficiency, and the like, which are performed when the VCSEL is driven, by using only the pair of upper electrode 32a or the pair of upper electrode 32b.

As described above, in the optical pick-up of this embodiment, a surface emitting laser array having an advantage that laser beam sources which can selectively irradiate laser beams having different polarization directions can be arrayed at high precision by the photolithographic technique is used. For this reason, a plurality of laser beam sources can be arranged in a small space in an optical pick-up, and the effective numerical aperture NA of the optical element of the optical pick-up can be controlled with respect to optical disks having different thicknesses without changing the arrangement of the optical pick-up which copes with a single type of optical disk. Therefore, a beam spot can be converged on any one of optical disks having a different thickness, and a reflected beam having high resolution can be obtained. For this reason, by utilizing the servo function of the optical pick-up, a recording/reproducing process can be reliably performed to optical disks having different thicknesses. In addition, in this optical pick-up of this embodiment, a plurality of laser beam sources are arranged in a surface emitting laser array at a pitch corresponding to the track pitch of each optical disk, and a tracking servo operation can be performed to optical disks having different track pitches by the three-beams method which can be reliably performed and can be easily controlled. Therefore, data processing can be more reliably performed to a plurality of optical disks having different recording densities. Furthermore, since the surface emitting laser array is employed, a large number of beams, which are required to control optical disks having a plurality of specifications by the three-beams method, can be emitted by an optical pick-up having a considerably simple arrangement. In this manner, the optical pick-up of this embodiment is a compact and light-weight optical pick-up in which a process of splitting a laser beam need not be performed to optical disks having different thicknesses and different track pitches. An inexpensive and highly reliable optical system can be applied, and reliable control coping with optical disks having different specifications can be performed. The optical pick-up of this embodiment is inexpensive and highly reliable, and can be expected to perform a reliable operation which rarely generates a write error or a read error for the optical disks having a plurality of specifications. The optical pick-up has high compatibility with various types of optical recording media for various applications which will be coexistent in the future, and is suitable for an optical recording system which can process these optical disks at once.

Although the present invention has been described above with reference to the optical element 15 having the objective lens 5 which is optimally designed for the thin optical disk 1b having a high recording density, an objective lens which is optimally designed for the thick optical disk 1a having a low recording density can be used as a matter of course. In this case, as a polarized hologram, a hologram designed such that a total numerical aperture of the objective lens and the polarized hologram is 0.6 for the optical disk 1b when the TM-polarized laser beam 7b is used and a converging operation can be performed to diffraction limit may be used. In addition, the value of the effective numerical aperture NA described above is only an example. In the optical pick-up according to the present invention, the effective numerical aperture NA is not limited to the above value, and the values of the specifications of the optical elements including an objective lens and the specification of the laser beam sources can be set to values suitable for the respective specifications of the optical disks.

Figure 15:
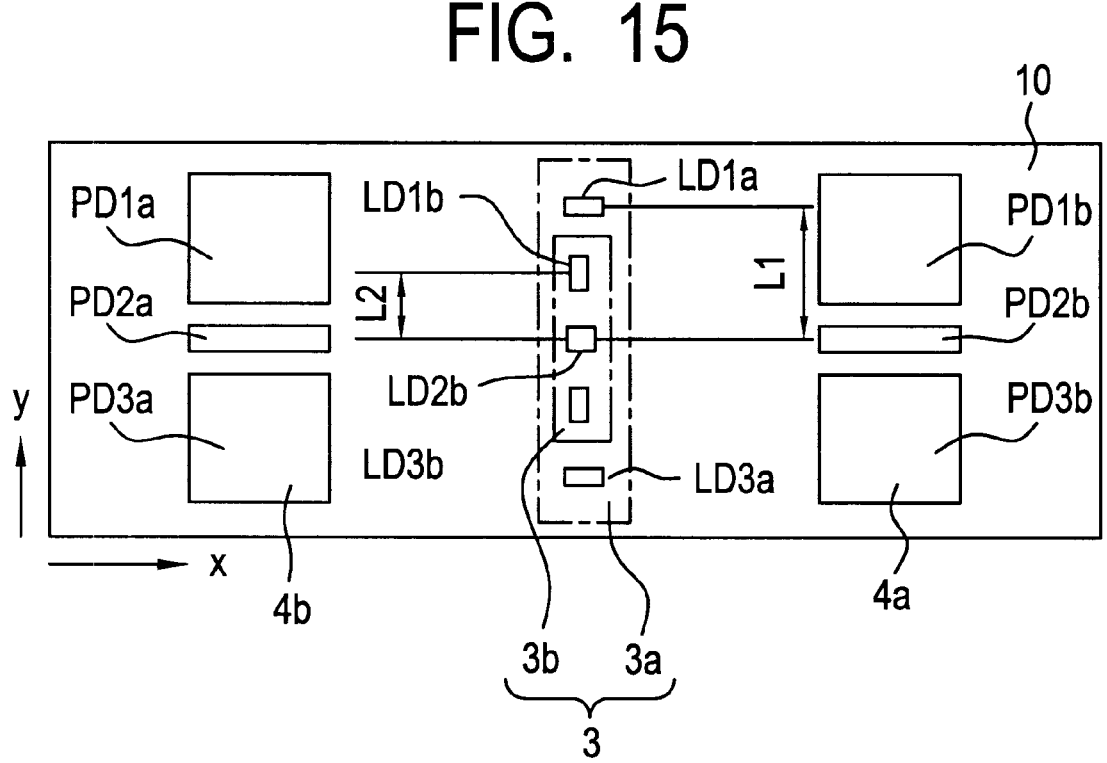
FIG. 15 is a view showing an arrangement of the surface of the integrated device of another optical pick-up according to the second embodiment of the present invention.

In this embodiment, although two rows of laser beam source groups having different pitches are arranged in the surface emitting laser array, the number of rows is not limited to two, and three or more rows can be used as a matter of course. The optical pick-up according to the present invention can cope with optical disks having three or more different thicknesses or optical disks having three or more different track pitches. As shown in FIG. 15, the first laser beam source group 3a and the second laser beam source group 3b can also be arranged in one row. The surface emitting laser array 3 in which five laser beam sources are formed in one row, is arranged in the center of the integrated device 10, and the photo detector arrays for signal detection 4a and 4b using photo diodes serving as light detectors, are arranged on both sides of the surface emitting laser array 3. Of the laser beam sources arranged in the surface emitting laser array 3, the central laser beam source LD2 is the laser beam source LD descried on the basis of FIG. 4 in the first embodiment, and is designed such that any one of TM-polarized light and the TE-polarized light can be selected by selecting electrodes to be emitted. Of the laser beam sources arranged on both sides, the laser beam sources LD1b and LD3b arranged at the pitch L2 are laser beam sources which can emit TM-polarized light shown in FIG. 13(b). The laser beam sources LD1a and LD3a arranged at the pitch L1, are laser beam sources which can emit TE-polarized light shown in FIG. 13(a).

Therefore, in the optical pick-up 2 employing the integrated device 10 of this embodiment, electrodes are selected to cause the central laser beam source LD2 to emit TE-polarized light to the thick optical disk 1a having a low recording density according to the CD standard, and the laser beam source LD2 is driven together with the laser beam sources LD1a and LD3a. Laser beams from the first laser beam source group 3a having these laser beam sources are irradiated on the optical disk according to the CD standard. Therefore, under this condition, since the numerical aperture of the optical element 15 is limited as in the above description, a recording/reproducing process can be performed to the optical disk having a thick substrate according to the CD standard. On the other hand, electrodes are selected to cause the central laser beam source LD2 to emit TM-polarized light to the thin optical disk 1b having a high recording density according to the DVD standard, and the laser beam source LD2 is driven together with the laser beam sources LD1b and LD3b. Laser beams from the second laser beam source group 3b are irradiated on the optical disk according to the DVD standard. Therefore, the numerical aperture of the optical element 15 is not limited, and a recording/reproducing process can be performed to the optical disk according to the DVD standard.

As a matter of course, depending on the conditions, such as arrangement states of the optical pick-up and the optical disk, the above process can also be performed such that a TM-polarized laser beam is irradiated on an optical disk according to the CD standard, and a TE-polarized laser beam is irradiated on an optical disk according to the DVD standard. The specifications, such as polarization directions of laser beams with respect to respective disks can be easily changed by only reversing the polarization direction of a polarization dependent optical element and the polarization direction of each laser beam source on the surface emitting laser array. For example, in a laser beam source formed in the surface emitting laser array of this embodiment, the polarization direction can be reversed by only changing the direction of attachment of electrodes of the surface emitting laser VCSEL or the direction of the selection of the electrodes or the direction of the long and short sides.

Furthermore, the lateral cross sectional shape of the column constituting the optical resonator can also be changed from a square or a rectangle to a regular polygon, such as a regular hexagon. Upper electrodes divided by six or more are used for each side, the polarization direction can be controlled in three or more directions, and an optical pick-up having compatibility with further various optical disks, can also be obtained.

As the substrate constituting the vertical cavity surface emitting laser, depending on the material of a semiconductor layer for determining the oscillation wavelength of the surface emitting laser diode, one of Si-based, GaAlAs-based, GaInP-based, ZnSSe-based, and InGaN-based semiconductor substrates or one of silicon oxide, aluminum oxide, aluminum nitride, silicon nitride dielectric substrates, may be used. The p-type and n-type of the semiconductor layer may be replaced with each other.

In this embodiment, although an integrated device in which a surface emitting laser and a photo detector array for signal detection are monolithically formed on a single substrate is used, a surface emitting laser array may be formed on another Si substrate on which a photo detector array for signal detection is formed. In addition, when a monitor for APC (Auto Power Control) of a laser beam is formed on a semiconductor substrate on the reverse side of the emitting direction of each emitting portion, it can be used as a backward emitting monitor. A forward emitting monitor can also be formed such that the monitor for APC is formed in the same plane as that of the surface emitting laser array 3 and the photo detector array 4, or formed at another position on the semiconductor substrate.

In this embodiment, although the surface emitting array and the photo detector array are formed on a single substrate, an electronic circuit having functions of performing current-voltage conversion of the photo detector array, an arithmetic operation for obtaining various signals, and the like, can also be integrally formed on this substrate. In addition, a structure in which, a silicon substrate, having a photo detector array (including an electrical circuit) formed thereon, and a surface emitting laser array, formed on another substrate, are positioned and arranged, can also be employed.

Third Embodiment

Figure 16:
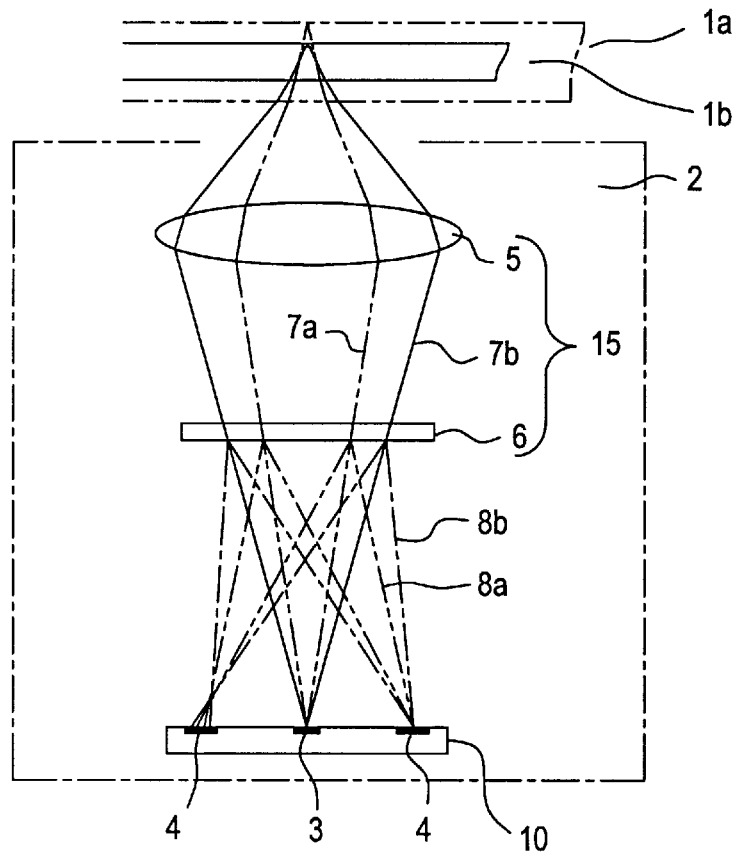
FIG. 16 is a schematic view showing the arrangement of an optical pick-up according to the third embodiment of the present invention.

FIG. 16 shows the third embodiment of an optical pick-up 2 according to the present invention, which can perform a recording/reproducing process to a thick optical disk 1a having a low recording density according to the CD standard, and a thin optical disk 1b having a high recording density according to the DVD standard. The optical pick-up 2 according to this embodiment also comprises an integrated device 10 in which a surface emitting laser array 3 serving as light sources and a photo detector array for signal detection 4 using photo diodes serving as light detectors, are monolithically formed on a single substrate (e.g., ntype GaAs substrate). A laser beams 7 emitted from the surface emitting laser array 3 are converged on the recording layer of an optical disk 1 by an objective lens 5 through a hologram 6 of an optical element 15. Reflected beams 8 reflected from the recording layer of the optical disk 1 are incident on the objective lens 5 through the same optical path as described above and diffracted by the hologram 6. The ±1-order lights of the diffracted reflected beams are converged to generate a conspicuous astigmatic aberration in the photo detector array 4 of the integrated device 10. Therefore, the optical pick-up of this embodiment is suitable for an optical recording system 17 as shown in FIG. 1.

Figure 17:
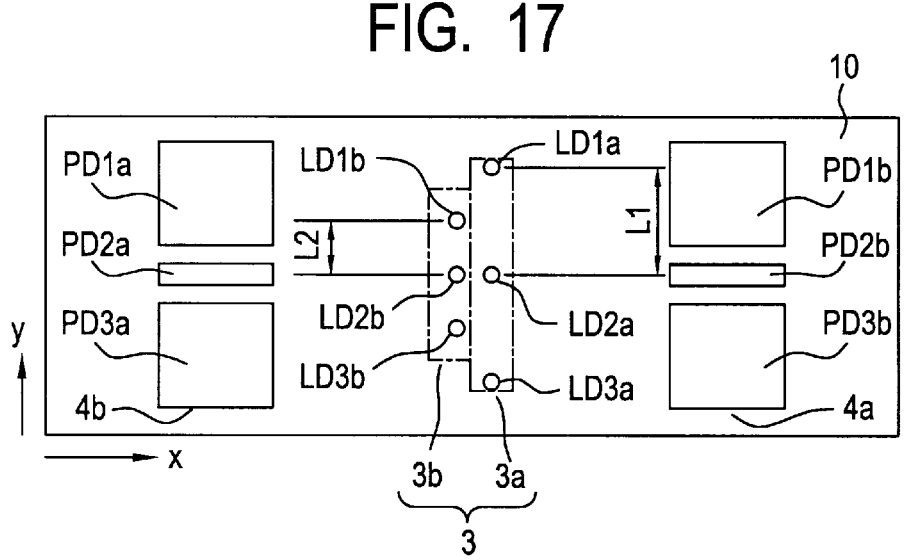
FIG. 17 is a view showing the arrangement of the surface of the integrated device in the optical pick-up shown in FIG. 16.

FIG. 17 is an enlarged view showing a plane arrangement of the integrated device 10 of this embodiment. The integrated device 10 of this embodiment comprises the surface emitting laser array 3 in which a plurality of laser beam sources LD for emitting laser beams are formed in two rows in near the center. First and second laser beam source groups 3a and 3b are formed such that a tracking operation by the three beams method and a focusing servo operation for the optical disks 1a and 1b can be performed as in the above-described embodiments. The first laser beam source group 3a on the right of the drawing is a laser beam source group for performing a recording/reproducing process to the optical disk 1a, having a thick substrate and a low recording density according to the CD standard. Three laser beam sources LD1a, LD2a, and LD3a constituting the laser beam source group 3a are arranged at a pitch L1 corresponding to the track pitch (1.6 mm) of the optical disk 1a according to the CD standard. A second laser beam source group 3b arranged parallel to the first laser beam source group 3a is a laser beam source group for performing a recording/reproducing process to the optical disk 1b having a thin optical disk and a high recording density according to the DVD standard. Three laser beam sources LD1b, LD2b, and LD3b constituting the second laser beam source group 3b are arranged at a pitch L2 corresponding the track pitch (0.74 mm) of the optical disk 1b according to DVD standard. Therefore, a ratio of pitches L1:L2 is almost equal to 1.6:0.74.

Furthermore, the laser beam sources of the first laser beam source group 3a of this embodiment have a radiation angle different from that of the laser beam sources of the second laser beam source group 3b, thereby controlling the effective numerical aperture of the optical element 15. Therefore, in the optical element of the optical pick-up 2 of this embodiment, the polarization dependent optical element used in the optical pick-up of each of the above-described embodiments, can be omitted. More specifically, the laser beam sources LD1a, LD2a, and LD3a constituting the first laser beam source group 3a is arranged such that a laser beam having a wavelength of about 650 nm can be irradiated at a radiation angle Q1, and the effective numerical aperture NA of the objective lens 5 of the optical element 15 is set to about 0.35. The laser beam sources LD1b, LD2b, and LD3b constituting the second laser beam source group 3b is arranged such that a laser beam having a wavelength of about 650 nm can be irradiated at a radiation angle Q2 larger than the radiation angle Q1, and the effective numerical aperture NA of the objective lens 5 is set to about 0.6.

On both sides of the first and second laser beam source groups 3a and 3b, two rows of photo detector groups 4a and 4b for detecting reflected beams are arranged parallel to the first and second laser beam source groups 3a and 3b. Three photo diodes PD1a, PD2a, and PD3a and three photo diodes PD1b, PD2b, and PD3b are arranged in the photo detector groups 4a and 4b such that a tracking error signal TES by the three-beams method, a focusing error signal FES, and a data signal RFS, are obtained in correspondence with laser beam sources LD1 to LD3. Since signal processes using data obtained by these photo diodes are the same as those in the above-described embodiments, a description thereof will be omitted. Since a manner in which reflected beams 8a or reflected beams 8b reflected from the optical disks 1a and 1b are converged on the photo diodes PD1a, PD1b, PD2a, PD2b, PD3a, and PD3b, is the same as that described with reference to FIGS. 9, 10, and 11, a description thereof will be omitted.

In the optical pick-up 2 of this embodiment, when the optical disk 1b having a high recording density and a thin substrate is set, the second laser beam source group 3b of the surface emitting laser array 3 is selected by a laser beam source selector 11 of the optical recording system shown in FIG. 1. The laser beams 7b are irradiated from the three laser beam sources LD1b, LD2b, and LD3b constituting the second laser beam source group 3b. The central laser beam source LD2b of these laser beam sources serves as a main beam source for outputting a data signal and a focusing error signal by an astigmatic aberration method, and the laser beam sources LD1b and LD3b arranged on both sides of the laser beam source LD2b serve as sub-beam sources for outputting tracking error signals by a three-beams method. These laser beams 7b emitted from the laser beam sources LD1b, LD2b, and LD3b are converged on the recording layer of the optical disk 1b by the objective lens 5 of the optical element 15. The objective lens 5 of this embodiment is optimally designed such that the laser beam 7b having a large radiation angle and emitted from the second laser beam source group 3b, can be converged to the diffraction limit on the recording layer of the thin optical disk 1b when the effective numerical aperture NA is 0.6. Therefore, positional control can be stably performed at high precision to the optical disk 1b according to the DVD standard, and the recording/reproducing process can be reliably performed.

On the other hand, when a process is performed by using the optical pick-up 2 of this embodiment to the thick optical disk 1a having a low recording density, for example, the first laser beam source group 3a of the surface emitting laser array is selected by the laser beam source selector 11 of the optical recording system shown in FIG. 1, and laser beams 7a are irradiated from the three laser beam sources LD1a, LD2a, and LD3a constituting the first laser beam source group 3a. The central laser beam source LD2a of these laser beam sources serves as a main beam source for outputting a data signal and a focusing error signal by an astigmatic aberration method, and the laser beam sources LD1a and LD3a arranged on both the sides of the laser beam source LD2a serve as sub-beam sources for outputting tracking error signals by a three-beams method. The laser beams 7a emitted from the laser beam source group 3a are converged on the recording layer of the optical disk 1a by the objective lens 5. The laser beam source 3a is designed to radiate a laser beam having a radiation angle smaller than that of a laser beam obtained from the laser beam source 3b, so that the effective NA is set to 0.35 when a laser beam radiated from the laser beam source 3a is incident on the objective lens 5. Therefore, by using the optical element 15 (objective lens 5) having a large numerical aperture and optimally designed for a thin optical disk having a substrate thickness of 0.6 mm and a high recording density, a convergent spot can be formed on a thick optical disk having a substrate of 1.2 mm and a low recording density, while suppressing a spherical aberration caused by a substrate thickness error. In the optical pick-up 2 of this embodiment, the effective numerical aperture NA of the objective lens 5 is limited to 0.35 by the laser beam radiated from the laser beam source 3a, and the laser beam 7a can be converged to almost the diffraction limit on the optical disk 1a having a substrate thickness of 1.2 mm and a low recording density.

When a numerical aperture of the optical element is limited by the radiation angle of a laser beam, a wave aberration and a jitter value are desirably set within the range described in the above embodiment, as a matter of course. Therefore, in the optical pick-up of this embodiment, the radiation angle Q1 of the first laser beam source group 3a is preferably set with respect to the radiation angle Q2 of the second laser beam source group 3b such that the limit rate of the effective numerical aperture NA of the optical element (objective lens) is set to about 50 to 64%. In consideration of an allowance in manufacturing the optical pick-up and an allowance in assembling the optical pick-up, the aperture limit rate is more preferably set to about 56% to 60%. In the optical pick-up 2 of this embodiment, as in the above-described embodiments, the radiation angles are selected such that the effective numerical aperture NA is set to about 58%.

In this manner, the optical pick-up 2 of this embodiment can apply the three-beam method in which stable control can be performed with a simple arrangement to the high-recording-density optical disk 1b and the low-recording-density optical disk 1a, which are different in thickness and track pitch. A tracking operation and a focusing control operation can be performed with the same control system. Therefore, the optical pick-up has high compatibility with optical disks having different specifications. In addition, since the optical pick-up can cope with the optical disks 1a and 1b by changing the radiation angle of a laser beam, the optical system which can be prevented from being complicated and has high reliability, can be employed, and the optical pick-up can be provided as an inexpensive and compact optical pick-up.

In order to form light sources for irradiating a plurality of laser beams having different radiation angles, a plurality of conventional edge emitting laser diodes may be arranged as a matter of course. However, a large number of semiconductor laser chips cannot be easily arranged in a small space to apply the three-beam method to a plurality of optical disks having different track pitches. In addition, a substrate for connecting these semiconductor chips to each other in order to operate them, is considered, and a considerably large optical pick-up is required. When an optical pick-up is to be assembled, the relationship between the irradiation positions of these semiconductor chips and a photo detector array for detecting reflected laser beams, must be adjusted. For this reason, the number of steps for assembling the optical pick-up increases, and the optical pick-up is very expensive.

In contrast to this, according to the present invention, the surface emitting laser array 3 in which a plurality of laser beam sources can be two-dimensionally arranged and integrated, is employed as the laser beam sources. Therefore, a plurality of laser beam sources can be arranged in a small area, and a laser beam is not irradiated from an edge, but irradiated perpendicular to the substrate. For this reason, as described above, the laser beam sources and light detectors such as photo diodes can be easily monolithically formed on a single substrate. In particular, in a vertical cavity surface emitting laser (to be referred to as a VCSEL hereinafter) in which a resonant path is arranged in a direction perpendicular to the substrate and which is employed in the above-described embodiment, the concentration of the two-dimensional array and the degree of freedom of an in-plane arrangement are high. The VCSEL may be most suitable for the optical pick-up according to the present invention.

Figure 18:
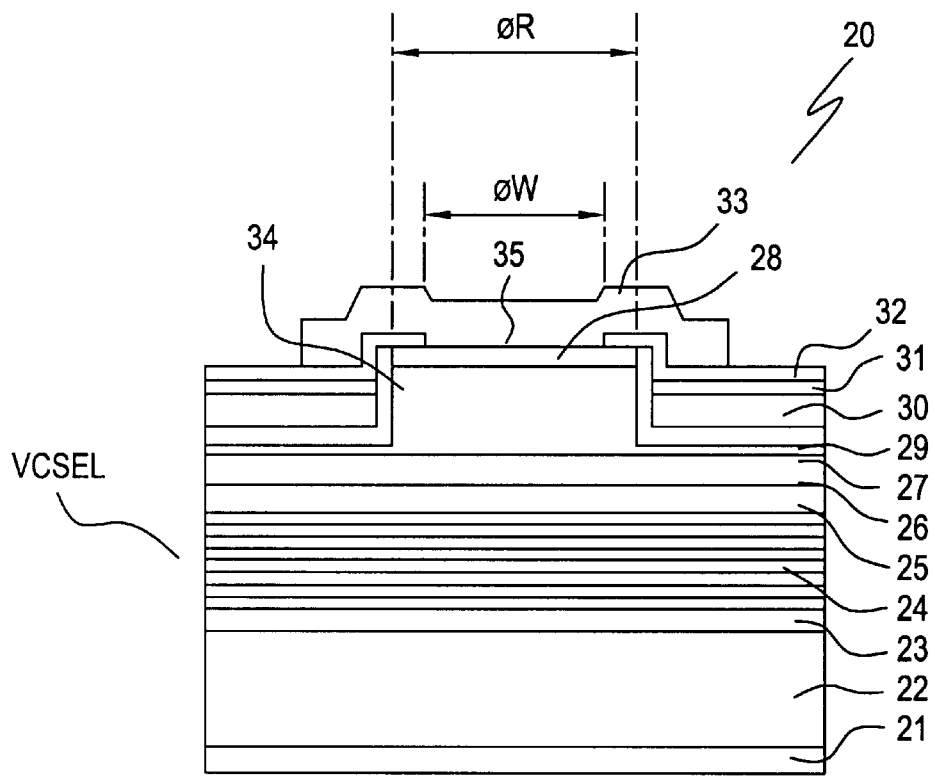
FIG. 18 is a view showing an arrangement of a vertical cavity surface emitting laser used in the optical pick-up shown in FIG. 16.
Figure 19:
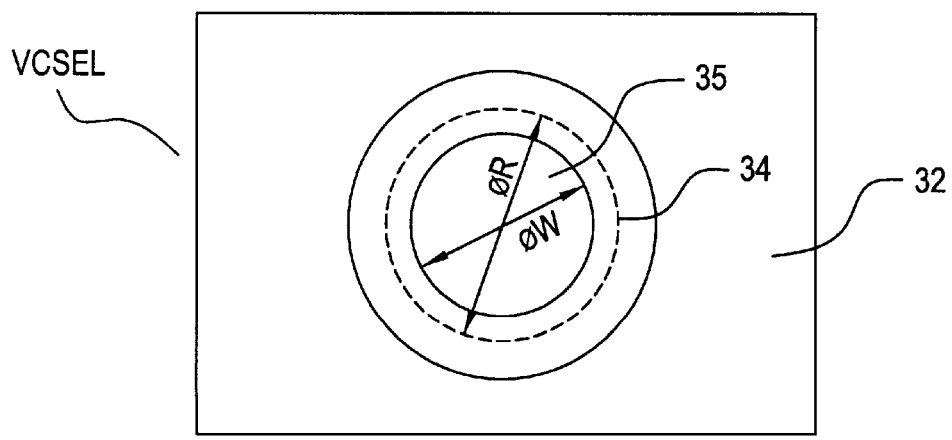
FIG. 19 is a plan view showing the vertical cavity surface emitting laser shown in FIG. 18 when viewed from the emitting direction of the laser beam.

FIG. 18 shows the arrangement of the VCSEL by using its cross sectional view. FIG. 19 shows the VCSEL of this embodiment when viewed from the emitting side of a laser beam. The VCSEL of the embodiment has the same arrangement as that of the VCSEL described with reference to FIG.

5, and comprises an optical resonator 20 in which a plurality of semiconductor layers are stacked between a pair of metal layers 21 and 32. An n-type GaAs substrate 22, an n-type GaAs buffer layer 23, sixty (60) pairs of semiconductor distributed Bragg reflectors 24 each constituted by an n-type AlAs layer and an n-type $Al_{0.5}Ga_{0.5}As$ layer and having a reflectance of 99% or more with respect to light having a wavelength of about 650 nm, an n-type $Al_{0.7}Ga_{0.3}As$ clad layer 25, a multi-quantum well active layer 26 constituted by five n⁻-type $Ga_{0.5}In_{0.5}P$ well layers and an n⁻-type $(Al_{0.5}Ga_{0.5})_{0.5}In_{0.5}P$ barrier layer, a p-type $Al_{0.7}Ga_{0.3}As$ clad layer 27, and a p-type $Al_{0.2}Ga_{0.8}As$ contact layer 28, are sequentially stacked on the optical resonator 20 from the bottom. And eight (8) pairs of dielectric multilayer reflectors 33 each constituted by a first layer, e.g., an $SiO_x$ layer such as $SiO_2$ and a second layer, e.g., a $TaO_x$ layer such as $Ta_2O_5$ and having a reflectance of 98.5% or more with respect to light having a wavelength of about 650 nm are formed on the area which sufficiently cover an exposed surface 35 (to be referred to as an aperture hereinafter) of the contact layer 28 on the emitting side. In place of this, 50 pairs of semiconductor distributed Bragg reflectors each constituted by a p-type AlAs layer and a p-type $Al_{0.5}Ga_{0.5}As$ layer and having a reflectance of 98.5% or more with respect to light having a wavelength of about 650 nm may be formed on the emitting side of the clad layer 27, and a p-type $Al_{0.3}Ga_{0.7}As$ contact layer may be stacked on the semiconductor distributed Bragg reflectors, as in the above-described embodiments. Epitaxial growth using the MOVPE method or epitaxial growth using the MBE method can be used to form these stacked layers.

In the VCSEL of this embodiment, the contact layer 28 and a part of the clad layer 27 are etched into an almost columnar shape when viewed from the upper surface of the resonator 20 (i.e., the emitting side), and this column 34 serves as a resonant portion. The periphery of the column 34 is buried with a first insulative layer 29 constituted by a silicon oxide film ($SiO_x$ film), such as an $SiO_2$ film formed by a thermal CVD method, and a metal layer 30 consisting of a metal such as a gold-zinc alloy. The first insulative layer 29 is continuously formed along the p-type $Al_{0.5}Ga_{0.5}As$ clad layer 27 and the surface of the contact layer 28, and the metal layer 30 is formed to bury a portion around the first insulative layer 29.

A second insulative layer 31 constituted by a silicon oxide film ($SiO_x$ film), such as an $SiO_2$ film formed by a spattering method, is formed on the surface of the metal layer 30, the metal layer (upper electrode) 32 consisting of, e.g., Cr and a gold-zinc alloy is formed on the second insulative layer 31 to be in contact with the contact layer 28, and the contact metal layer 32 serves as an electrode for current injection. The upper electrode 32 is attached such that a circular opening is formed in the column 34 on the emitting side, and the inside of the upper electrode 32 serves as the aperture 35. Therefore, in the VCSEL of this embodiment, a current is injected from the upper electrode 32, the current is guided to the active layer 26 to be converted into light, the light is amplified by the column 34, and the laser beam is emitted from the aperture 35 to the outside.

In the surface emitting laser array 3 used in the optical pick-up 2 of this embodiment, laser beam sources LD having different radiation angles are required. For this reason, in this embodiment, the radiation angle of a laser beam emitted from the aperture 35 is controlled by changing the diameter fW of the aperture 35.

Figures 20, 21:
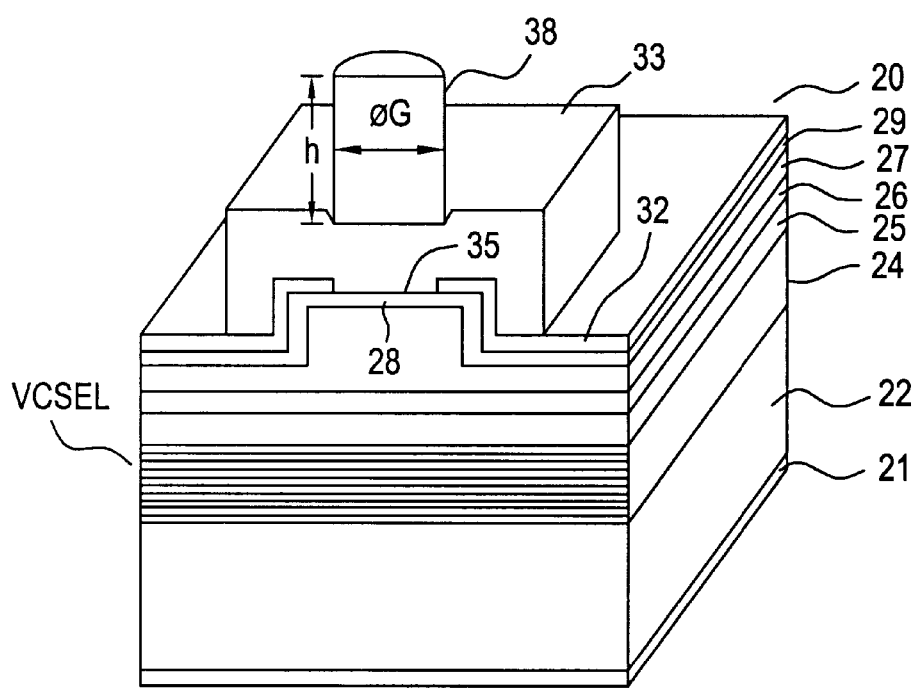
FIG. 20 is a table showing a manner of a change in radiation angle by the aperture diameter of the vertical cavity surface emitting laser shown in FIG. 18.
FIG. 21 is a view showing a state wherein a waveguide is arranged on the vertical cavity surface emitting laser shown in FIG. 18.

FIG. 20 shows diameters fW of the aperture 35 when a diameter fR of the column 34 is 15 mm, and a manner of a change in radiation angle of a laser beam depending on the diameters fW. FIG. 20 shows values obtained when fR is 15 mm. However, this value is only exemplified such that the radiation angle can be largely changed, and fR is not limited to a specific value while the VCSEL performs single lateral mode lasing. In this manner, in the surface emitting laser VCSEL, when fW is changed, the radiation angle can be easily adjusted within the range of about 20° to 6°, and the effective numerical aperture NA of the objective lens 5 can be controlled to the above-described value. Note that the shapes of the aperture 35 and the column 34 are not limited to circular shapes, and polygonal shapes may be used, as a matter of course.

As shown in FIG. 21, a waveguide 38 is formed in the upper portion of the dielectric multilayer reflector 33. When any one of the refractive index, diameter, and length of the waveguide 38 is changed, a laser beam source LD which emits a laser beam at a desired radiation angle can also be constituted. The diameter and length of the waveguide 38 are changed depending on the refractive index of the material, and its diameter fG and length h are desirably set within the following ranges, respectively, to make limitations on manufacturing and single mode lasing:

$$1 \text{ mm} <= fG <= 13 \text{ mm} \quad 0.3 \text{ mm} <= h <= 5 \text{ mm} \tag{11}$$

As the material constituting the waveguide 38, $SiO_x$ (silicon oxide), $Ta_2O_5$ (tantalum pentoxide), $SiN_x$ (silicon nitride), or $TiO_x$ (titanium oxide), can be used. In addition, when the waveguide 38 is constituted by using the same material as that constituting the dielectric multilayer reflector 33, the reflector 33 and the waveguide 38 can be simultaneously formed. In this manner, in the VCSEL of this embodiment, the radiation angle of a laser beam can be easily controlled by forming the waveguide 38. Therefore, in the optical pick-up 2 of this embodiment, the following state can be selected. That is, the waveguides 38 are formed on the laser beam sources LD1b, LD2b, and LD3b of the surface emitting laser array 3b for irradiating a laser beam having a large radiation angle, and a state wherein the waveguides 38 are not formed on the laser beam sources LD1a, LD2a, and LD3a for irradiating a laser beam having a small radiation angle. Naturally, the waveguides 38 may be arranged on all the laser beam sources LD, so that the radiation angles are controlled by changing any one of the refractive index, diameter, and length of the each waveguide.

Figure 22:
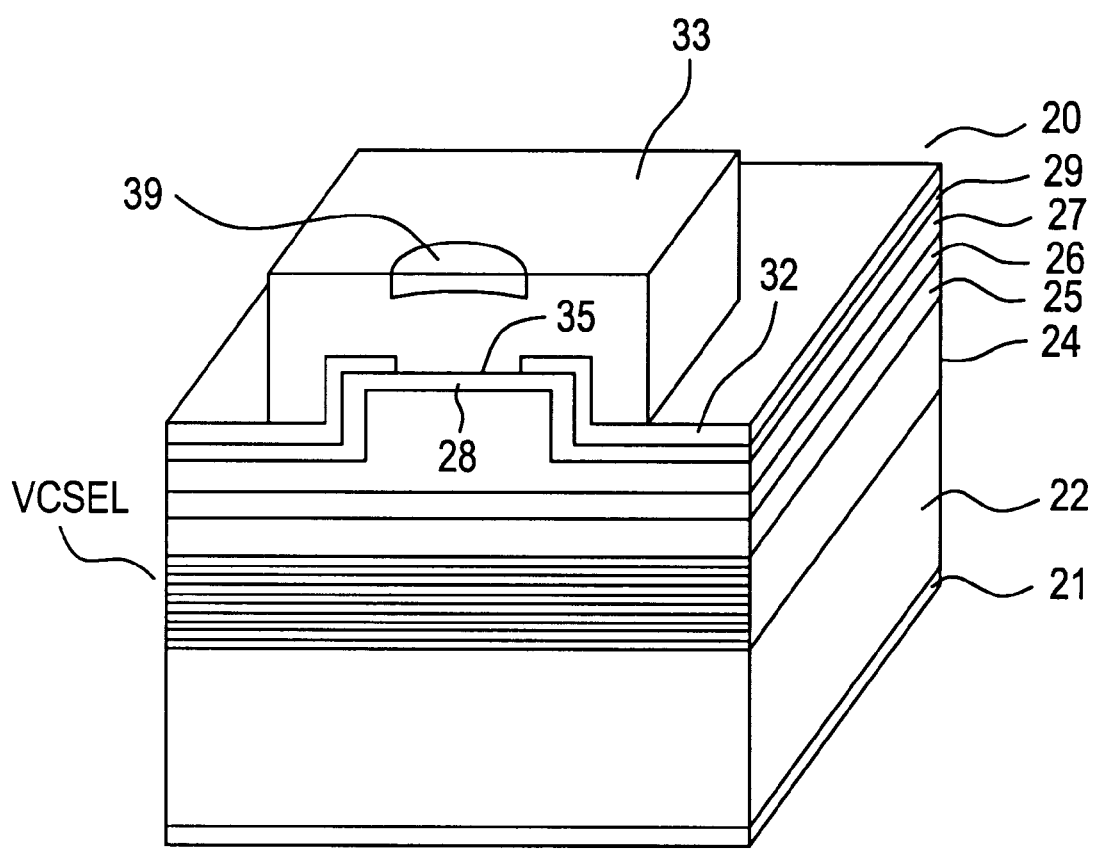
FIG. 22 is a view showing a state wherein a micro lens is arranged on the vertical cavity surface emitting laser shown in FIG. 18.

As shown in FIG. 22, a micro lens 39 can be arranged on the upper portion of the dielectric multilayer reflector 33 and controlled such that a laser beam having a desired radiation angle is emitted by the refractive power of the micro lens 39. The micro lens 39 is formed in the following manner: that is, an opening is formed in the reflector 33 by a photolithographic technique, and the resultant structure is subjected to ion exchange treatment to control reflective distribution, thereby obtaining predetermined refractive power. Therefore, this structure has an extremely high arrangement concentration, an extremely high degree of freedom of an in-plane arrangement, and is suitable to constitute a lens array on the surface emitting laser VCSEL of this embodiment. In the optical pick-up 2 of this embodiment, the following state can be selected. That is, the micro lenses (e.g., concave micro lenses) 39 each having negative refractive power, are arranged on the laser beam sources LD1b, LD2b, and LD3b of the surface emitting laser array 3b for irradiating laser beams each having a large radiation angle, and no micro lenses 39 are arranged on the laser beam sources LD1a, LD2a, and LD3a for laser beams each having a small radiation angle. Naturally, the micro lenses 39 may be arranged on all the laser beam sources LD, so that the radiation angles are controlled by changing the refractive powers of the respective micro lenses.

As has been described above, in the optical pick-up of this embodiment, laser beam sources which can irradiate laser beams having different radiation angles, are employed, and a plurality of laser beam sources having different radiation angles can be formed in a small space by using a surface emitting laser array. For this reason, an optical pick-up which can control the effective numerical aperture NA of an optical system for optical disks having different thicknesses can be provided. Therefore, the optical pick-up according to the present invention can converge beam spots on any one of optical disks having different thicknesses, and a reflected beam having high resolution can be obtained.

For this reason, by utilizing the servo function of the optical pick-up, a recording/reproducing process can be reliably performed to the optical disks having different thicknesses. In addition, in the optical pick-up of this embodiment, a plurality of laser beam sources are arranged in a surface emitting laser array at a pitch corresponding to the track pitch of each optical disk, a tracking servo operation can be performed to optical disks having different track pitches by using the three-beams method which can be reliably operated. Therefore, data processing can be more reliably performed to a plurality of optical disks having different recording densities.

As in the optical pick-up of this embodiment, processes such as the process of moving an optical element in an optical system, the process of switching optical elements, and the process of splitting one laser beam into a plurality of laser beams by the optical system, need not be performed. Therefore, an inexpensive and highly reliable optical system which is used in a conventional technique can be applied without being changed. The laser beam source group of the surface emitting laser array may be selected depending on the thickness and track pitch of an optical disk. Since this control can be easily electrically performed, the control can be realized at low cost with a simple arrangement, and an optical pick-up having high reliability and high durability can be provided.

Since a laser beam source group corresponding to each optical disk can be selectively used, the energy of the laser beam is not dispersed, and an optical pick-up which can prevent electric power from being wasted and has low power consumption can be realized. Therefore, the optical pick-up of this embodiment is inexpensive, highly reliable, can form a convergent spot on an optical disk, and is suitable for a phase change recording medium, a programmable optical recording medium, such as a magneto-optical recording medium, or a write-once optical recording medium. In addition, the optical pick-up has high compatibility with various types of optical recording media for various applications which will be coexistent in the future. Therefore, the optical pick-up is suitable for an optical recording device which can process the various types of optical disks at once.

In this embodiment, although two rows of laser beam source groups having different pitches are arranged in the surface emitting laser array, the number of rows is not limited to two, and three or more rows can be used as a matter of course. Although this embodiment exemplifies the three-beam method which is used by utilizing the characteristics of the surface emitting laser array which can freely two-dimensionally arrange a large number of laser beam sources, an optical pick-up which obtains a tracking error signal by using the push-pull method or the differential phase tracking method described in the previous embodiments can be used. In the optical pick-up described above, at least two laser beam sources having different radiation angles are desirably arranged in the surface emitting laser array. In this embodiment, the value of the numerical aperture NA is only an example. The present invention is not limited to the above embodiments, optical pick-ups according to the present invention include all optical pick-ups according to the accompanying claims, as a matter of course.

As has been described above, in the optical pick-up according to the present invention, the convergent performance of an optical system, especially a numerical aperture, can be changed, and at least two types of laser beams can be emitted from a surface emitting laser array. These laser beams are emitted from the above laser beam sources having different radiation angles, and the radiation angle of the laser beam can be controlled by changing the aperture diameter of the laser beam source formed in the surface emitting laser array, or by forming a waveguide or a micro lens. These elements can be easily incorporated in the steps in manufacturing the surface emitting laser array, and the optical pick-up of this embodiment can be manufactured at low cost. In addition, the surface emitting laser array can be easily manufactured on a single semiconductor substrate on which a photo detector is formed. With respect to this, the manufacturing cost can be reduced. Since the problem that a laser element and a photo detector are positionally matched with each other can be canceled, an inexpensive optical pick-up having higher precision can be provided.

In the present invention, an optical pick-up which can control the numerical aperture of an optical element by using laser beams having different polarization directions and emitted from a surface emitting laser array, can also be provided. In this manner, according to the present invention, the effective numerical aperture of the optical element having an objective lens, or the like, is controlled by controlling or selecting laser beam sources, and it is made possible to perform a recording/reproducing process to optical recording media having different specifications, such as an optical recording medium having a high recording density and a small thickness, and an optical recording media having a low recording density and a large thickness. For this reason, laser beams can be irradiated on optical recording media having different specifications without splitting the laser beams. The optical element and control system of the optical pick-up can be simply constituted. Furthermore, a plurality of laser beam sources can be formed in a small area by employing a surface emitting laser array, control using the three-beam method is employed to a plurality of optical disks, and tracking and focusing can be controlled by the same control system. As described above, according to the present invention, a compact and inexpensive optical pick-up having high reliability and compatibility with optical disks having different specifications, is realized.

By using the optical pick-up according to the present invention, an optical pick-up having high compatibility with a conventionally thick CD having a low recording density, and a thin DVD having a high recording density and expected as a future recording medium, can be realized. Additionally, an optical pick-up which is suitable for an optical recording system which can process these optical recording media at once, can be provided. Since high focusing performance can be kept for every optical recording medium, an optical recording system or an information processing system which can perform a highly reliable process while preferably performing tracking control, and focusing control and which can handle various types of optical disks, can be provided.

Industrial Applicability

An optical pick-up and an optical recording system according to the present invention can perform a recording/reproducing process to optical recording media having different thicknesses, such as an optical disk according to the CD standard and an optical disk according to the DVD standard, and is used in an optical recording system or an information processing system which handles various types of data, such as program data, image data, and audio data.

We claim:

1. An optical pick-up comprising a light source for emitting a laser beam, an optical element for converging the laser beam on an optical recording medium, and a light detector for detecting a reflected beam reflected from the optical recording medium, wherein said light source comprises a surface emitting laser in which a laser beam source emits at least two types of laser beams and changes an effective numerical aperture of said optical element.

2. An optical pick-up according to claim 1, wherein said surface emitting laser comprises first and second laser beam sources which have different effective numerical apertures in said optical element and emit first and second laser beams, respectively.

3. An optical pick-up according to claim 2, wherein the first and second laser beams have different polarization directions, and said optical element comprises an objective lens for converging the first and second laser beam on the optical recording medium and a polarization dependent optical element which changes a numerical aperture of said objective lens for the first and second laser beams.

4. An optical pick-up according to claim 3, wherein a limit rate of the numerical aperture of said polarization dependent optical element is about 50 to 64%.

5. An optical pick-up according to claim 3, wherein a limit rate of the numerical aperture of said polarization dependent optical element is about 56 to 60%.

6. An optical pick-up according to claim 3, wherein apertures are formed in said polarization dependent optical element and have aperture areas changed depending on the polarization direction of the laser beam.

7. An optical pick-up according to claim 3, wherein said polarization dependent optical element is a polarized hologram which controls a dispersion angle of at least one of the first and second laser beams.

8. An optical pick-up according to claim 3, wherein said first and second laser beam sources are vertical cavity surface emitting lasers that include a plurality of optical resonators, each optical resonator including a pair of reflective layers, a clad layer, an active layer, and a pair of electrode layers that are stacked in the emitting direction of the laser beam;

said optical resonator including said clad layer extending in an emitting direction of the laser beam into a columnar shape having an almost regular polygonal cross-section, and a pair of electrodes including said electrode layers divided on the emitting side of the laser beam and connected to opposite sides of said column; and said first and second laser beam sources comprise said optical resonators having said pairs of electrodes having connecting directions different from each other.

9. An optical pick-up according to claim 8, wherein said column has an almost square section.

10. An optical pick-up according to claim 3, wherein said first and second laser beam sources are vertical cavity surface emitting lasers that include a plurality of optical resonators each optical resonator including a pair of reflective layers, a clad layer, an active layer, and a pair of electrode layers that are stacked in the emitting direction of the laser beam;

said optical resonator including said clad layer extending in an emitting direction of the laser beam into a columnar shape having a polygonal cross-section, and at least first and second pairs of sides of the columnar shape having different lengths; and said first and second laser beam sources comprise said optical resonators having different directions.

11. An optical pick-up according to claim 10, wherein said column has an almost rectangular cross-section.

12. An optical pick-up according to claim 2, wherein the first and second laser beams are emitted from said first and second laser beam sources at different radiation angles, and said optical element comprises an objective lens for converging the first and second laser beams on an optical recording medium.

13. An optical pick-up according to claim 12, wherein a radiation angle of the first laser beam is selected with respect to a radiation angle of the second laser beam such that an aperture limit rate of said optical element is set to about 50 to 64%.

14. An optical pick-up according to claim 12, wherein a radiation angle of the first laser beam is selected with respect to a radiation angle of the second laser beam such that an aperture limit rate of said optical element is set to about 56 to 60%.

15. An optical pick-up according to claim 12, wherein said first and second laser beam sources are vertical cavity surface emitting lasers that include a plurality of optical resonators, each optical resonator including a pair of reflective layers, a clad layer, an active layer, and a pair of metal layers that are stacked in the emitting direction of the laser beam; and said first and second laser beam sources have different ratios of aperture diameters used for emitting the laser beams from said optical resonators to diameters of said optical resonators.

16. An optical pick-up according to claim 12, wherein said first and second laser beam sources comprise vertical cavity surface emitting lasers that include a plurality of optical resonators, each optical resonator including a pair of reflective layers, a clad layer, an active layer, and a pair of metal layers that are stacked in the emitting direction of the laser beam; and said first and second laser beam sources include waveguides that are further stacked on said reflective layers from which the laser beams are emitted, and at least one of a refractive index, a diameter, and a length of said waveguides are different from each other.

17. An optical pick-up according to claim 12, wherein said first and second laser beam sources are vertical cavity surface emitting lasers that include a plurality of optical resonators, each optical resonator including a pair of reflective layers, a clad layer, an active layer, and a pair of metal layers that are stacked in the emitting direction of the laser beam; and said first and second laser beam sources have micro lenses having different refractive powers and formed on said reflective layer on a side from which the laser beams are emitted.

18. An optical pick-up according to claim 2, wherein said surface emitting laser array comprises a first laser beam source group in which at least three first laser beam sources are arranged at a first pitch and a second laser beam source group in which at least three second laser beam sources are arranged at a second pitch, and the first and second pitches are different from each other.

19. An optical pick-up according to claim 18, wherein when a magnification of said optical element is represented by m, the first pitch is represented by L1, and the second pitch is represented by L2, the following relationship is satisfied:

$$m \times (L2/L1) \geq 2$$

where L2<L1.

20. An optical pick-up according to claim 18, wherein when a magnification of said optical element is represented by m, the first pitch is represented by L1, and the second pitch is represented by L2, the following relationship is satisfied:

$$m \times (L2/L1) \geq 8/3$$

where L2<L1.

21. An optical pick-up according to claim 1, wherein said surface emitting laser comprises said laser beam source which selectively emits first and second laser beams having different polarization directions, and said optical element comprises an objective lens for converging the first and second laser beams on an optical recording medium and a polarization dependent optical element which changes a numerical aperture of said objective lens with respect to the first and second laser beams.

22. An optical pick-up according to claim 21, wherein said surface emitting laser is a surface emitting laser array comprising first and second laser beam sources for emitting the first and second laser beams.

23. An optical pick-up according to claim 21, wherein a limit rate of a numerical aperture of said polarization dependent optical element is about 50 to 64%.

24. An optical pick-up according to claim 21, wherein a limit rate of a numerical aperture of said polarization dependent optical element is about 56 to 60%.

25. An optical pick-up according to claim 21, wherein apertures are formed in said polarization dependent optical element and have aperture areas changed depending on the polarization directions of the laser beams.

26. An optical pick-up according to claim 21, wherein said polarization dependent optical element is a polarized hologram which controls a dispersion angle of at least one of the first and second laser beams.

27. An optical pick-up according to claim 21, wherein said laser beam source comprises a vertical cavity surface emitting laser that includes an optical resonators including a pair of reflective layers, a clad layer, an active layer, and a pair of electrode layers that are stacked in the emitting direction of the laser beam;

said optical resonator including said clad layer extending in an emitting direction of the laser beam into a columnar shape having an almost regular polygonal cross-section, and pairs of electrodes including said electrode layers divided on the emitting side of the laser beam and connected to opposite sides of said column; and the first and second laser beams are emitted by switching said pairs of electrodes.

28. An optical pick-up according to claim 27, wherein said column has an almost square cross-section.

29. An optical pick-up according to claim 1, further comprising a diffractor for diffracting the reflected beam into ±1-order lights to converge on light detectors, the light detectors being arranged around said light sources, wherein said surface emitting laser and said light detectors are formed on a single semiconductor substrate.

30. An optical recording system comprising:

an optical pick-up according to claim 1;

laser beam control means for controlling said surface emitting laser; and position control means for positionally controlling said optical pick-up on the basis of signals from said light detectors.

* * * * *